(12) United States Patent
Onishi et al.

(10) Patent No.: US 6,347,174 B1
(45) Date of Patent: Feb. 12, 2002

(54) NON-LINEAR OPTICAL FIBER, OPTICAL FIBER COIL, AND WAVELENGTH CONVERTER

(75) Inventors: Masashi Onishi; Toshiaki Okuno; Shinji Ishikawa; Tomonori Kashiwada; Masayuki Nishimura, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/297,173

(22) PCT Filed: Jul. 3, 1998

(86) PCT No.: PCT/JP98/03010

§ 371 Date: Jul. 6, 1999

§ 102(e) Date: Jul. 6, 1999

(87) PCT Pub. No.: WO99/10770

PCT Pub. Date: Mar. 4, 1999

(30) Foreign Application Priority Data

Aug. 27, 1997 (JP) .............................. 9-230957
Aug. 27, 1997 (JP) .............................. 9-230958
Aug. 27, 1997 (JP) .............................. 9-230959

(51) Int. Cl.[7] .............................. H04N 5/91; G02F 1/35
(52) U.S. Cl. .................. 385/122; 385/123; 359/326
(58) Field of Search ................................ 385/122, 123, 385/43, 126, 127, 27, 28; 359/326

(56) References Cited

U.S. PATENT DOCUMENTS 5,619,368 A * 4/1997 Swanson .................. 359/326

FOREIGN PATENT DOCUMENTS

| JP | 3-121426 | 5/1991 |
| JP | 405005909 A * | 1/1993 |
| JP | 9-26517 | 1/1997 |
| JP | 9-203914 | 8/1997 |
| JP | 10-228040 | 8/1998 |
| JP | 10-232415 | 9/1998 |

OTHER PUBLICATIONS

IEEE Photonics Technology Letters, vol. 9, No. 3, Mar. 1990, T.Yamamoto et al, "Highly Efficient four–Wave Mixing in an Optical Fiber with Intensity Dependent Phase Meeting", P.327–329.

H. Kanamori et al, "Characteristics of High NA/SM Fiber Fabricated by VDA Method (in Japanese)" 1989, Autumun Meeting on IEICE, P.4–254.

IEEE Photonics Technology Letters, vol. 7, No. 9, Sep. 1995, M.J. Holmes et al "Highly Nonlinear Optical Fiber for All OPtical Processing Applications", P. 1045–1047.

(List continued on next page.)

Primary Examiner—Frank G. Font
Assistant Examiner—Roy M. Punnoose
(74) Attorney, Agent, or Firm—McDermott, Will & Emery

(57) ABSTRACT

The present invention relates to a nonlinear optical fiber which can generate a nonlinear optical phenomenon with high efficiency, an optical fiber coil wound with the nonlinear optical fiber, and a wavelength converter equipped with the nonlinear optical fiber. In particular, the nonlinear optical fiber according to the present invention has, as characteristics with respect to input light having a predetermined wavelength, a mode field diameter of 5 µm or less, a polarization mode dispersion of 1 ps/km$^{1/2}$ or less or a fixed plane of polarization, a zero-dispersion wavelength of not less than 1.5 µm but not greater than 1.6 µm, a cutoff wavelength of not less than 1.4 µm but not greater than 1.7 µm at a length of 2 m, a transmission loss of 3 dB/km or less, and a nonlinear coefficient of 10/W/km or more. As a result of this configuration, the nonlinear optical fiber generates, with high efficiency, desirable converted light occurring upon the nonlinear phenomenon.

26 Claims, 10 Drawing Sheets

OTHER PUBLICATIONS

S hintaro Sentsui, "Trend of Latest Technology of Optical Fiber (in Japanese)", Electronic Parts and Materials,. vol. 33, No. 12 (Dec., 1994), P. 79–84.

OFC 97 Optical Fiber Communication Conference and Exhibit, Technical digest 1997 OSA vol. 6 Feb. 16–21 1997 P. 168–169.

IEEE Photonics Technology Letters, vol. 6, No. 12, Dec. 12,1994, "Tunable and Selective Wavelength conversion Using Fiber Four–Wave Mixing with Two Pump Lights" Kyo Inoue, Member IEEE P. 1451–1453.

IEEE Photonics Technology Letters, vol. 7, No. 9, Sep. 1995 Highly Nonlinear Optical Fiber for All Optical Processing Applications, M. J. Holmes et al, P. 1045–1047.

Fiber and Integrated Optics, vol. 15, No. 3, 1996, special Issue Four–Wave Mixxing in Semiconductor Laser Amplifiers: Applications for Optical Communication Systems, R. Ludwig et al. P. 211–223.

IEEE Photonics Technology Letters, vol. 4, No. 1, Jan. 1992, "Wavelength Conversion Experiment Using Fiber Four –Wave Mixing",Kyo Inoue et al. P. 69–72.

Aug. 15, 1994/vol. 19, No. 16/Optics Letters "Arrangement of fiber pieces for a wide wavelength conversion range by fiber four–wave mixing" K. Inoue. P. 1189–1191.

* cited by examiner

Fig.5

| FIBER | Δ⁺ (%) | Δ⁻ (%) | 2a (μm) | MFD (μm) | NONLINEAR COEFFICIENT γ | ZERO-DISPERSION WAVELENGTH (nm) | TRANSMISSION LOSS (dB/km) | CUT OFF WAVELENGTH (μm) | PMD (ps/km^(1/2)) | 2b (μm) | FATIGUE COEFFICIENT |
|---|---|---|---|---|---|---|---|---|---|---|---|
| A | 2 | 0.35 | 4.6 | 4.2 | 13.2 | 1552 | 0.33 | 1500 | 0.1 | 125 | 21 |
| B | 2.5 | 0.35 | 4.4 | 4 | 16.3 | 1553 | 0.42 | 1550 | 0.09 | 125 | 20 |
| C | 3 | 0.35 | 4.1 | 3.7 | 20.4 | 1551 | 0.51 | 1630 | 0.07 | 125 | 22 |
| D | 2 | 0 | 4.9 | 4.6 | 12.1 | 1552 | 0.63 | 1430 | 0.05 | 125 | 20 |
| E | 2.5 | 0 | 4.8 | 4.2 | 15.5 | 1552 | 0.9 | 1525 | 0.11 | 125 | 21 |
| F | 3 | 0 | 4.7 | 3.9 | 18.4 | 1553 | 1.5 | 1675 | 0.08 | 124 | 21 |
| G | 1.5 | 0.35 | 4.8 | 4.7 | 9.5 | 1555 | 0.28 | 1370 | 0.05 | 125 | 22 |
| H | 3.5 | 0.35 | 4.2 | 3.5 | 22.1 | 1556 | 0.58 | 1742 | 0.09 | 126 | 20 |
| I | 4 | 0.35 | 4.1 | 3.4 | 24.2 | 1552 | 0.9 | 1849 | 0.08 | 125 | 21 |
| J | 2 | 0.35 | 4.6 | 4.2 | 13.5 | 1555 | 0.32 | 1502 | 0.11 | 125 | 110(Carbon) |
| K | 2.5 | 0.35 | 4.3 | 3.9 | 16.1 | 1560 | 0.42 | 1548 | 0.05 | 125 | 150(Carbon) |
| L | 3 | 0.35 | 4.1 | 3.7 | 20.2 | 1545 | 0.52 | 1628 | 0.03 | 125 | 132(Carbon) |

*Fig.9*

|  | BARREL DIAMETER AT 60mm | | BARREL DIAMETER AT 20mm | |
| --- | --- | --- | --- | --- |
|  | BENDING LOSS (dB/km) | PMD $(ps/km^{\frac{1}{2}})$ | BENDING LOSS (dB/km) | PMD $(ps/km^{\frac{1}{2}})$ |
| COIL 1 | 0 | 0.05 | 0 | 0.07 |
| COIL 2 | 0 | 0.05 | 0 | 0.1 |
| REFERENCE | 0.5 | 0.04 | 5000 | (UNMEASURABLE) |

NON-LINEAR OPTICAL FIBER, OPTICAL FIBER COIL, AND WAVELENGTH CONVERTER

This application is a national phase of international application PCT/JP98/03010 filed Jul. 3, 1998 which designated the U.S.

TECHNICAL FIELD

The present invention relates to a nonlinear optical fiber for generating a nonlinear optical phenomenon with respect to input light, an optical fiber coil comprising the nonlinear optical fiber, and a wavelength converter comprising the nonlinear optical fiber or optical fiber coil as its component.

BACKGROUND ART

It has been known in general that, when light having a high intensity (high optical density) propagates through a medium, there occur various nonlinear optical phenomena due to the nonlinear polarization in the medium. For example, among these nonlinear optical phenomena, second-harmonic generation is a phenomenon caused by a second-order nonlinear effect, in which, when two photons having the same energy enter the medium, a new single photon having a doubled energy is generated. On the other hand, four-wave mixing is a phenomenon caused by a third-order nonlinear effect, in which, when three photons enter the medium, a new single photon is generated therefrom. These nonlinear optical phenomena occur with the highest efficiency when both energy conservation law and momentum conservation law hold true among the plurality of photons involved in the nonlinear optical phenomena.

Applications of wavelength conversion and the like using such nonlinear optical phenomena occurring in optical fibers have also been reported. For example, a first document of M. J. Homes, et al., IEEE Photon. Technol. Lett., Vol. 7 (1995) No. 9, pp. 1045–1047 reports a nonlinear optical fiber obtained when a dispersion-shifted optical fiber is doped with Ge (germanium) element. A second document of K. Inoue, et al., IEEE Photon. Technol. Lett., Vol. 4 (1992) No. 1, pp. 69–72 and a third document of K. Inoue, et al., Opt. Lett., Vol. 19 (1994) No. 16, pp. 1189–1191 report attempts at wavelength conversion using the four-wave mixing generated in a dispersion-shifted optical fiber.

In addition to the above-mentioned first to third documents, a fourth document of D. A. Pastel et al., OFC' 97 Technical Digest WL6b (1997) reports applications of nonlinear optical fibers and optical switches.

Further, in addition to the above-mentioned second and third documents, a fifth document of K. Inoue, IEEE Photon. Technol. Lett., Vol. 6 (1994) No. 12, pp. 1451–1453 reports a technique using the four-wave mixing in a dispersion-shifted optical fiber, which is a wavelength conversion technique in a wide wavelength band in which two excitation light beams having wavelengths different from each other are made incident on the optical fiber, and the wavelength of one of the excitation light beams is changed. Also, a sixth document of R. Ludwig, et al., Fiber and Integrated Optics, Vol. 15 (1996) pp. 211–223 reports an attempt at wavelength conversion using the four-wave mixing generated in a semiconductor amplifier.

DISCLOSURE OF THE INVENTION

Having studied the above-mentioned prior art, the inventors have found the following problems. Namely, in general, nonlinear optical phenomena occur weakly, with the third-order nonlinear optical phenomena being weaker than the second-order nonlinear optical phenomena, and therefore in any of the above-mentioned techniques it is necessary for the optical fiber to be elongated in order to attain nonlinear light (a new light component outputted as a result of a nonlinear optical phenomenon) having a sufficient intensity. In particular, for realizing a wavelength converter using the four-wave mixing generated in an optical fiber, the optical fiber for generating the nonlinear optical phenomenon is required to have a length of a few km or longer.

On the other hand, for realizing a wavelength converter or optical switch using a nonlinear optical phenomenon occurring in such an optical fiber, it is important technical problem to reduce the size of a coil constituting the optical fiber (hereinafter referred to as optical fiber coil). However, since the optical fiber is long as mentioned above, and its bending loss is large, it has been difficult for such an optical fiber coil to have a smaller size.

Meanwhile, the wavelength conversion technique disclosed in the above-mentioned sixth document is advantageous in that the apparatus itself can easily be made smaller since the four-wave mixing is generated in the semiconductor amplifier, and in that the band capable of wavelength conversion is wide, for example. Nevertheless, it has had a problem that noise is so high that the S/N ratio is low. By contrast, each of the wavelength conversion techniques disclosed in the second, third, and fifth documents is superior in terms of the S/N ratio since the four-wave mixing is generated in an optical fiber. Even in such a configuration, however, in order to attain converted light (a new light component generated by the wavelength conversion using the four-wave mixing) having a sufficient power, it is necessary for the optical fiber to have a length of a few km or longer, thus making it difficult for the optical fiber coil to reduce its size.

Also, due to the principle of the wavelength conversion using the four-wave mixing, the wavelength conversion efficiency is maximized when the excitation light wavelength is made to coincide with the zero-dispersion wavelength of the optical fiber, whereas the converted light drastically lowers its power as the difference between their wavelengths is greater. Hence, in the technique disclosed in the second document, the excitation light has a fixed wavelength, thereby the wavelength of the converted light is determined uniquely according to the signal light wavelength. Also, while the wavelength of the excitation light is made variable in the technique disclosed in the fifth document, the power of the converted light to be outputted would decrease as the wavelength shifts from the zero-dispersion wavelength. Namely, it has been very difficult to attain a wider band of wavelength conversion in the conventional wavelength converters using optical fibers.

In order to overcome the problems mentioned above, it is an object of the present invention to provide a nonlinear optical fiber which can generate a nonlinear optical phenomenon with high efficiency; an optical fiber coil, which can be made smaller, comprising the nonlinear optical fiber; and a wavelength converter with a compact configuration, which can output converted light having a desirable wavelength with high efficiency over a wide band, comprising the optical fiber coil or nonlinear optical fiber.

The nonlinear optical fiber according to the present invention is an optical fiber which generates a nonlinear phenomenon with respect to input light having a predetermined wavelength, e.g., one or more signal light components in the wavelength band of 1.55 μm (1500 nm to 1600 nm), comprises a core region and a cladding region provided at an outer periphery of the core region, and is mainly composed of $SiO_2$. In order to realize a wavelength conversion technique for overcoming the above-mentioned problems, this nonlinear optical fiber has, as characteristics with respect to the input light, a mode field diameter (hereinafter referred to as MFD) of 5 μm or less, a polarization mode dispersion of 1 $ps/km^{1/2}$ or less, a zero-dispersion wavelength of not less than 1.5 μm but not greater than 1.6 μm, a cutoff wavelength of not less than 1.4 μm but not greater than 1.7 μm at a fiber length of 2 m, a transmission loss of 3 dB/km or less, and a nonlinear coefficient of at least 10/W/km.

Also, in the nonlinear optical fiber according to the present invention, at least the above-mentioned core region is doped with $GeO_2$ of not less than 15 mol % but not greater than 35 mol % on average, so as to realize a desirable refractive index profile. Thus, with respect to signal light in a desirable wavelength band (light in the 1.55-μm band having often been used recently), this nonlinear optical fiber not only generates a nonlinear phenomenon with high efficiency but also is effective in that favorable signal light transmission characteristics can be secured, for example. In other words, this nonlinear optical fiber can yield converted light having a practically sufficient power at a shorter length.

More specifically, the nonlinear optical fiber has an MFD of 5 μm or less. In general, the smaller is MFD, the better becomes the nonlinear characteristic of an optical fiber. In a silica glass type optical fiber in which at least its core region is doped with $GeO_2$, the nonlinear coefficient can be made 10/W/km or higher when the above-mentioned condition for MFD is satisfied.

Also, the nonlinear coefficient of the nonlinear optical fiber according to the present invention is 10/W/km or more. It has been known that the wavelength conversion efficiency due to the four-wave mixing used for wavelength conversion is in proportion to the square of the nonlinear coefficient. As can also be seen from this fact, this nonlinear optical fiber would realize a wavelength conversion efficiency at least 10 times that of the conventional optical fiber, as long as the above-mentioned condition concerning the nonlinear coefficient is satisfied.

The polarization mode dispersion of the nonlinear optical fiber according to the present invention is not greater than 1 $ps/km^{1/2}$. The transmission rate to be currently realized is 10 Gb/s or higher, thus necessitating a pulse width of less than several tens of ps. In such a transmission system, it is necessary for the spreading of pulse in the optical fiber, which acts as an optical transmission medium, to be restricted to such an extent as to be negligible in practice, and therefore it will be more preferable if the above-mentioned condition concerning polarization mode dispersion is satisfied.

The zero-dispersion wavelength of the nonlinear optical fiber according to the present invention is not less than 1.5 μm but not greater than 1.6 μm. In the four-wave mixing, it is important for the zero-dispersion wavelength and the wavelength of the excitation light to coincide with each other. Also, when the zero-dispersion wavelength resides within this range, the excitation can be caused by the excitation light in a center portion of its wavelength conversion band.

The transmission loss of the nonlinear optical fiber according to the present invention is not greater than 3 dB/km. When the transmission loss within the optical fiber exceeds 3 dB/km, the effect of enhancing the nonlinear coefficient cannot effectively be utilized anymore. In other words, unless the above-mentioned condition concerning the transmission loss is satisfied, the wavelength conversion efficiency will deteriorate due to attenuation of the excitation light, and the power of the converted light will decrease.

Further, the cutoff wavelength of the nonlinear optical fiber according to the present invention, measured at an optical fiber length of 2 m, is not less than 1.4 μm but not greater than 1.7 μm. This condition concerning the cutoff wavelength is a condition measured at a fiber length of 2 m which is based on the international standard of ITU-T. In order for an optical fiber having a length of 1000 m or more to attain a cutoff wavelength of 1.55 μm or shorter, the cutoff wavelength at a fiber length of 2 m must be 1.7 μm or shorter. On the other hand, for satisfying the above-mentioned condition concerning the zero-dispersion wavelength, it is necessary for the cutoff wavelength at a fiber length of 2 m to be 1.4 μm or longer.

The nonlinear optical fiber according to the present invention may be a polarization-maintaining optical fiber having a fixed plane of polarization. Such a polarization-maintaining optical fiber comprises a stress-applying structure for applying a stress in a direction substantially perpendicular to the light propagating axis of the optical fiber. Specifically, this stress-applying structure is positioned at locations in the cladding region substantially symmetrical to each other with respect to the core region, and may be realized by providing an $SiO_2$ area doped with $B_2O_3$. This structure can hold the plane of polarization of input light at a predetermined direction and is further suitable for generating the nonlinear optical phenomenon with high efficiency.

For preventing a further nonlinear optical phenomenon from occurring between the input light and converted light, the dispersion slope of the nonlinear optical fiber according to the present invention is preferably not less than 0.01 $ps/km/nm^2$, and more preferably not less than 0.05 $ps/km/nm^2$, with respect to the input light (e.g., one or more light components each having a wavelength of 1500 nm to 1600 nm). As mentioned above, in the wavelength conversion using four-wave mixing, highly efficient wavelength conversion can be realized in the widest wavelength band when the wavelength of the input excitation light coincides with the zero-dispersion wavelength of the nonlinear optical fiber. When the optical fiber generating the nonlinear optical phenomenon has a small dispersion slope, however, wavelength conversion may occur efficiently between signal light beams in wavelength-division multiplexing (WDM) and between converted light beams being newly produced, thereby generating a very large number of converted light beams. Namely, all the light components other than the light component generated upon wavelength conversion from the incident excitation light are noise light components, which cause transmission quality to deteriorate. For avoiding such an inconvenience, the dispersion slope of the optical fiber generating the nonlinear optical effect is required to be set to a value which is somewhat high. Specifically, a nonlinear optical fiber having a dispersion slope of 0.01 $ps/nm^2/km$ or more is necessary for a 16-wave WDM transmission system which is ready for a signal channel interval of 100 GHz in compliance with the international standard of ITU-T, and a nonlinear optical fiber having a dispersion slope of 0.05 $ps/nm^2/km$ or more is necessary for a WDM transmission system of about 32 waves.

The nonlinear optical fiber according to the present invention may further comprise a structure for suppressing backward scattering caused by stimulated Brillouin scattering which may be generated by input light. Specifically, this scattering-light-suppressing structure can be realized when the $GeO_2$ content in the core region is controlled such as to change continuously or stepwise along a longitudinal direction of the nonlinear optical fiber. This scattering-light-suppressing structure can be realized not only by controlling the $GeO_2$ content but also by continuously changing the outside diameter of the core region along the longitudinal direction of the nonlinear optical fiber. In this case, the outside diameter of the cladding region may be either held constant regardless of the change in outside diameter of the core region or changed along with such change. Here, it is not necessary for the ratio of the outside diameter of the core region to the outside diameter of the cladding region to be constant.

The cladding region may include an area doped with F element. This configuration can also realize a refractive index profile of a depressed cladding structure. Similarly, the refractive index profile of the core region can employ various configurations.

Preferably, the nonlinear optical fiber according to the present invention comprises a hermetic coat disposed at an outer periphery of the cladding region. When the outer periphery of the cladding region is provided with the hermetic coat, then, even when the nonlinear optical fiber is submerged in water or exposed to a highly humid environment for a long period of time, fatigue will be restrained from progressing, and hydrogen will effectively be inhibited from invading the optical fiber. Thus, its reliability can be assured over a longer period of time.

The nonlinear optical fiber according to the present invention can be employed in an optical fiber coil which is suitable for a component such as a wavelength converter, an optical switch, or the like using a wavelength conversion technique. The optical fiber coil can be obtained when a nonlinear optical fiber having the above-mentioned characteristics including a predetermined polarization mode dispersion such as that mentioned above or a polarization-maintaining fiber (included in the nonlinear optical fiber according to the present invention) having the above-mentioned characteristics other than the predetermined polarization mode dispersion is wound at a predetermined diameter. In this case, these optical fibers can be made into coils by winding them around a bobbin having a barrel of a predetermined diameter.

In particular, for the purpose of an optical fiber coil according to the present invention, the nonlinear optical fiber preferably has, as characteristics with respect to input light having a predetermined wavelength, a bending loss of 0.1 dB/km or less and a polarization mode dispersion of 1 $ps/km^{1/2}$ or less when wound into a coil having a minimum diameter of 60 mm or less. Also, as a configuration enabling a further smaller size in the optical fiber coil according to the present invention, the nonlinear optical fiber preferably has, as characteristics with respect to input light having a predetermined wavelength, a bending loss of 1 dB/km or less and a polarization mode dispersion of 2 $ps/km^{1/2}$ or less when wound into a coil having a minimum inner diameter of 20 mm or less.

For preventing the transmission characteristic from deteriorating, the bending loss is preferably held as small as possible. In the case of a practical optical component, the maximum permissible value of bending loss is 1 dB/km. When the bending loss is greater than this value, output power may vary among wavelengths, thereby deteriorating the transmission characteristic remarkably. In the optical transmission at a frequency of 10 Gbit/sec or higher, there may be a case where the bending loss at 1 dB/km is still unfavorable. In this case, it is necessary for the coil diameter (the minimum diameter when the nonlinear optical fiber is wound, which can be defined by the barrel diameter of the bobbin) to be made greater, so as to suppress the bending loss to 0.1 dB/km or less.

The optical fiber coil according to the present invention can be realized by the nonlinear optical fiber having a length of 1 km or less. Here, the nonlinear optical fiber constituting the optical fiber coil (the nonlinear optical fiber according to the present invention, which generates a nonlinear optical phenomenon with high efficiency) may also be provided with a hermetic coat around the outer periphery of the cladding region.

The wavelength converter according to the present invention comprises a nonlinear optical fiber having the above-mentioned characteristics including a predetermined polarization mode dispersion such as that mentioned above or a polarization-maintaining fiber (included in the nonlinear optical fiber according to the present invention) having the above-mentioned characteristics other than the predetermined polarization mode dispersion. As the wavelength converter comprises the above-mentioned optical fiber coil as its component, it can attain a smaller size.

Specifically, the wavelength converter according to the present invention comprises an excitation light source for outputting excitation light; a multiplexing section for multiplexing and outputting the excitation light and signal light; a nonlinear optical fiber, having a length of 1 km or less, for receiving the excitation light and signal light outputted from the multiplexing section and generating a nonlinear phenomenon with respect to the excitation light; and a wavelength-converting section for selecting a wavelength of light to be outputted and outputting converted light having thus selected wavelength, the converted light being generated by the nonlinear optical fiber.

The nonlinear optical fiber (including the polarization-maintaining optical fiber) applicable to the wavelength converter according to the present invention has, as characteristics with respect to the excitation light, a mode field diameter of 5 μm or less, a polarization mode dispersion of 1 $ps/km^{1/2}$ or less or a fixed plane of polarization, a zero-dispersion wavelength of not less than 1.5 μm but not greater than 1.6 μm, a cutoff wavelength of not less than 1.4 μm but not greater than 1.7 μm at a fiber length of 2 m, a transmission loss of 3 dB/km or less, and a nonlinear coefficient of 10/W/km or more as mentioned above.

The nonlinear optical fiber applicable to the wavelength converter according to the present invention may be a polarization-maintaining fiber which maintains the plane of polarization of the excitation light at a predetermined direction. For generating a nonlinear optical phenomenon with high efficiency, it is preferable for the nonlinear optical fiber to have a dispersion value of approximately 0 ps/nm/km with respect to a predetermined wavelength component of the excitation light at a given point along its longitudinal direction.

Preferably, the excitation light source has a structure for changing the wavelength of the excitation light. In this case, though the wavelength of the converted light to be outputted from the wavelength converter becomes variable, high-power converted light can be obtained over a wide wavelength range, since the nonlinear optical fiber not only generates a nonlinear optical phenomenon with high efficiency but also has a short fiber length. Also, from the viewpoint of reducing the size of the apparatus as a whole, the excitation light source is preferably an optical fiber laser light source using an optical fiber doped with a rare earth element. For yielding converted light having a sufficient power, the excitation light source preferably outputs excitation light having a power of 10 dBm or higher. It is due to the fact that, when the converted light outputted from the nonlinear optical fiber has a power of −25 dBm or less, then its transmission characteristic would deteriorate under the influence of noise light even if it is amplified. Namely, for yielding converted light having a power of −25 dBm or higher, it is necessary for the excitation light source to output excitation light having a power of 10 dBm or higher.

In the wavelength converter according to the present invention, the input end of the nonlinear optical fiber is connected to the output end of the multiplexing section via an optical fiber whose connection loss is 1 dB or less. On the other hand, the output end of the nonlinear optical fiber is connected to the input end of the wavelength-selecting section via an optical fiber whose connection loss is 1 dB or less. When the excitation light and signal light entering the nonlinear optical fiber are attenuated at connecting portions, then the power of input light in the nonlinear optical fiber will decrease, thereby the resulting converted light will have a relatively smaller power. On the other hand, on the exit end side of the nonlinear optical fiber, the power of thus generated converted light as output light is also attenuated at the connecting portion with the wavelength-selecting section. Hence, for yielding converted light having a power of −25 dBm or higher, the connection loss at each of the above-mentioned connecting portions is required to be suppressed to 1 dB or less.

Preferably, in the wavelength converter according to the present invention, the input end of the nonlinear optical fiber is connected to the output end of the multiplexing section via an optical fiber having a mode field diameter successively increasing along a path though which the signal light propagates, whereas the output end of the nonlinear optical fiber is connected to the input end of the wavelength-selecting section via an optical fiber having a mode field diameter successively decreasing along the path though which the signal light propagates. Here, the optical fiber can be constituted by a plurality of optical fibers having mode field diameters different from each other. This configuration can also suppress the transmission loss in signal light, excitation light, and converted light, thereby yielding converted light with a sufficient power.

Further, in a preferable embodiment, the wavelength converter according to the present invention may comprise a converted-light-amplifying section for optically amplifying the converted light, and may comprise an excitation-light-amplifying section for optically amplifying the excitation light. This configuration can also eliminate detrimental effects caused by the transmission loss of each kind of light.

In thus configured wavelength converter, the wavelength band of signal light in which the decrease in spectral intensity of the converted light with respect to the maximum spectral intensity of the converted light becomes 3 dB or less has a width of 10 nm greater. Namely, a bandwidth of 10 nm or wider is necessary for a WDM transmission system of 16 waves or more which is ready for the signal channel interval of 100 GHz in compliance with the international standard of ITU-T. Also, since the permissible deviation in power of the resulting converted light is considered to be about 3 dB at the maximum, the wavelength bandwidth in which the wavelength conversion efficiency of the nonlinear optical fiber applied to the wavelength converter decreases by 3 dB is required to be 10 nm or wider.

In the wavelength converter according to the present invention, the nonlinear optical fiber outputs converted light at a conversion efficiency of 0.1% or higher with respect to the inputted signal light. Namely, it is necessary for the converted light to have a power of −25 dBm or greater as mentioned above. Hence, for obtaining such converted light, it is necessary for the wavelength converter to have a wavelength conversion efficiency of −30 dB (=0.1%) or higher.

BRIEF DESCRIPTION OF THE DRAWINGS

FIG. 1 is a view showing a typical sectional configuration of nonlinear optical fiber according to the present invention, whereas

FIG. 5 is a table showing results of evaluation of nonlinear optical fibers according to the present invention prepared with different parameters;

FIG. 9 is a table showing results of measurement of bending loss and polarization mode dispersion carried out under their predetermined conditions for individual embodiments of the optical fiber coil according to the present invention and a reference example;

BEST MODES FOR CARRYING OUT THE INVENTION

In the following, embodiments of the nonlinear optical fiber according to the present invention will be explained with reference to FIGS. 1A to 6C. In the explanation of the drawings, constituents identical to each other will be referred to with numerals or letters identical to each other without their overlapping descriptions being repeated.

Figure 1A:
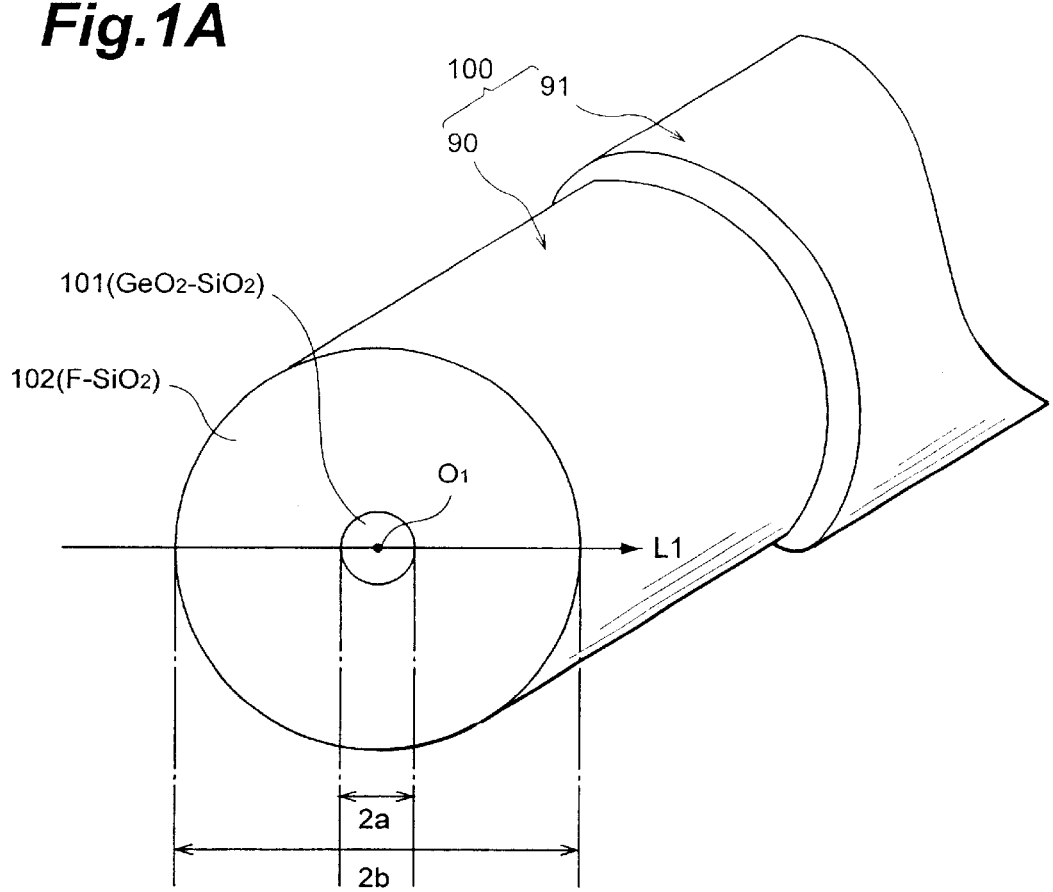
Figure 1B:
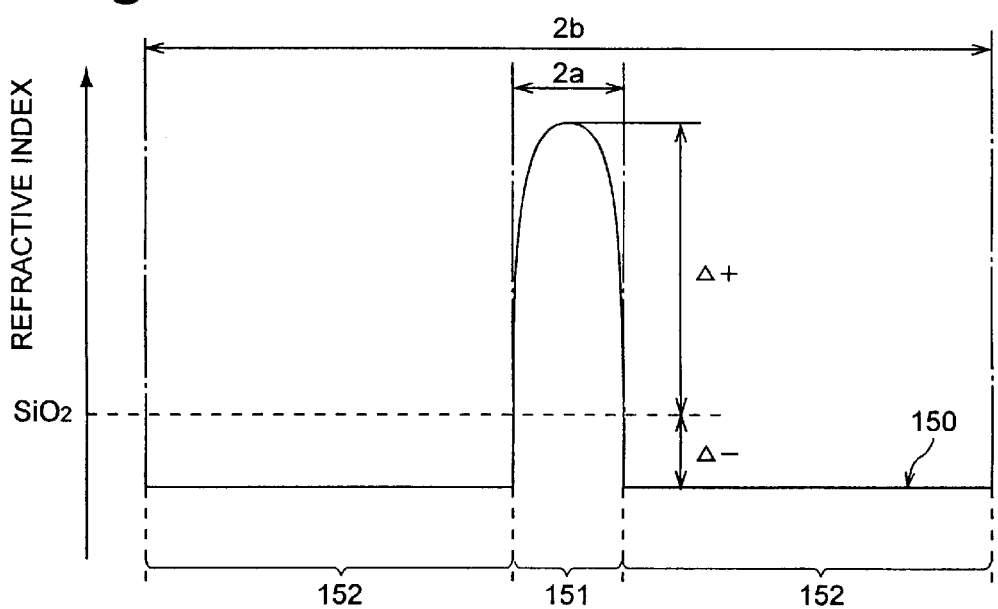
FIG. 1B is a view showing a refractive index profile of the nonlinear optical fiber shown in FIG. 1A.

FIG. 1A is a view showing a typical sectional configuration of nonlinear optical fiber according to the present invention. FIG. 1B is a view showing a refractive index profile of the nonlinear optical fiber 100 shown in FIG. 1A. This refractive index profile 150 corresponds to the refractive index at each location along a line L1 orthogonal to the optical axis of the nonlinear optical fiber 100. The nonlinear optical fiber 100 according to this embodiment comprises a bare fiber 90 having a matched cladding type refractive index profile 150 in which a cladding region 102 is provided around a core region 101; and a hermetic coat 91 provided around the outer periphery of the bare fiber 90. In the bare fiber 90, the refractive index of the core region 101 is higher than that of the cladding region 102. In FIG. 1A, the diameter of the core region 101 is indicated by 2a, whereas the outer diameter of the cladding region 102 (i.e., the outer diameter of the bare fiber 90) is indicated by 2b. Further, in the refractive index profile 150 of FIG. 1B, a region 151 indicates the refractive index of each location on the line L1 in the core region 101, whereas regions 152 indicate the refractive index of each location on the line L1 in the cladding region 102. In FIG. 1A, $O_1$ indicates the intersection between the optical axis of the nonlinear optical fiber 100 and the line L1. In the refractive index profile 150, the relative refractive index difference of the core region 101 with respect to pure silica ($SiO_2$) is represented by $\Delta^+$ defined as follows, whereas the relative refractive index difference of the cladding region 102 with respect to $SiO_2$ is represented by $\Delta^-$ defined as follows:

$$\Delta^+ = |n_{core} - n_0|/n_0$$

$$\Delta^- = |n_{clad} - n_0|/n_0$$

wherein $n_{core}$ is the refractive index of the core region 101, $n_{clad}$ is the refractive index of the cladding region 102, and $n_0$ is the refractive index of pure silica. In this specification, each of these relative refractive index differences $\Delta^+$, $\Delta^-$ is expressed in terms of percentage.

An optical fiber having such a refractive index profile 150 is obtained when the core region 101 of the optical fiber is mainly composed of $SiO_2$ is doped with an additive for enhancing its refractive index. In the nonlinear optical fiber 100 according to this embodiment, since it is necessary to obtain a large relative refractive index difference as will be mentioned later, it is preferred that a high concentration (e.g., 15 mol % or more but 35 mol % or less) of $GeO_2$ (germanium oxide) be added to the core region 101. In FIG. 1A, such a core region 101 is represented as $GeO_2$—$SiO_2$.

Apparently, within this numerical range of the $GeO_2$ content, the ratio of contribution of Rayleigh scattering is small, and stimulated Brillouin scattering becomes dominant, whereas the gain and band of Brillouin scattering depend on the $GeO_2$ content, the diameter 2a and material of the core region 101, and the like. Therefore, by continuously changing the $GeO_2$ content and/or core diameter within a predetermined range along the optical axis, the nonlinear optical fiber 100 can generate about the same degree of a nonlinear optical phenomenon independently of the light propagating direction, while restraining stimulated Brillouin scattering from occurring (see FIGS. 4A to 4C).

Preferably, in the nonlinear optical fiber 100, the cladding region 102 is doped with F (fluorine) element. In FIG. 1A, such a cladding region 102 is indicated by F—$SiO_2$. In this case, as the refractive index of the cladding region 102 becomes lower than that of pure silica, the difference between the refractive index of the core region 101 and that of the cladding region 102 further increases. Though the transmission loss of an optical fiber obtained by drawing a $GeO_2$-doped preform at a high temperature increases in general, when the outer peripheral portion of the preform (to become the cladding region of the drawn optical fiber) is doped with F element, then the preform will soften such as to facilitate the drawing, thereby restraining the transmission loss of the resulting optical fiber from increasing. Preferably, the F element content is not less than 0.2 wt % but not greater than 2.0 wt %, for example.

With respect to at least one signal light component in the signal light wavelength band of 1.55 μm, the nonlinear optical fiber 100 has a mode field diameter (MFD) of 5 μm or less, a polarization mode dispersion (PMD) of 1 ps/km$^{1/2}$ or less, a zero-dispersion wavelength of 1.5 μm or more but 1.6 μm or less, a cutoff wavelength of 1.4 μm or more but 1.7 μm or less at a length of 2 m, a transmission loss of 3 dB/km or less, and a nonlinear coefficient γ of 10/W/km or more. When the cutoff wavelength at a length of 2 m is within the above-mentioned range, then a single mode will be secured for signal light in the 1.55-μm wavelength band at a fiber length (100 m or longer) which is used in practice.

Here, the nonlinear coefficient γ is defined by the following equation:

$$\gamma = 2\pi \cdot n_2/\lambda/A_{eff} \qquad (1)$$

wherein $n_2$ is the nonlinear refractive index of the effective refractive index with respect to light intensity, $A_{eff}$ is the effective cross-sectional area, and λ is the wavelength of light. Here, the nonlinear refractive index $n_2$ is the coefficient in the term of intensity I of light when the effective refractive index n of the nonlinear optical fiber is expressed, as a linear equation of light intensity (square of electric field amplitude of light) I:

$$n = n_0 + n_2 \cdot I \qquad (2)$$

and is a value proportional to the real part of the third-order nonlinear susceptibility. Also, the smaller is the value of effective cross-sectional area $A_{eff}$, the higher becomes the energy density of the propagating light in the core region 101. Hence, the nonlinear coefficient γ defined by the above-mentioned equation (1) is an index indicating the efficiency at which the nonlinear optical phenomenon occurs per unit length of the optical fiber and per unit light intensity. The higher is this value, the higher becomes the efficiency at which the nonlinear optical phenomenon occurs. The value of nonlinear coefficient γ in the conventional optical fiber is about 3/W/km.

As disclosed in Japanese Patent Application Laid-Open No. 8-248251, the effective cross-sectional area $A_{eff}$ is given by the following equation (3):

$$A_{eff} = 2\pi (\int_0^\infty E^2 r dr)^2 / (\int_0^\infty E^4 r dr) \qquad (3)$$

wherein E is the electric field accompanying the propagating light, and r is the radial distance from the core center.

The dispersion slope is defined by the gradient of the graph showing the dispersion spectrum in a predetermined wavelength band.

Among the above-mentioned conditions, the respective conditions concerning MFD and nonlinear coefficient γ are those for generating the nonlinear optical phenomenon with high efficiency. The respective conditions concerning PMD and zero-dispersion wavelength are those for securing a favorable transmission characteristic in the signal light wavelength band of 1.55 μm. The condition concerning cutoff wavelength is that for securing a single mode in a predetermined wavelength band, whereas the condition concerning transmission loss is that for reducing the loss of light involved in the nonlinear optical phenomenon. Setting the $GeO_2$ content within the above-mentioned numerical range satisfies the above-mentioned respective conditions concerning MFD and cutoff wavelength.

Figure 2:
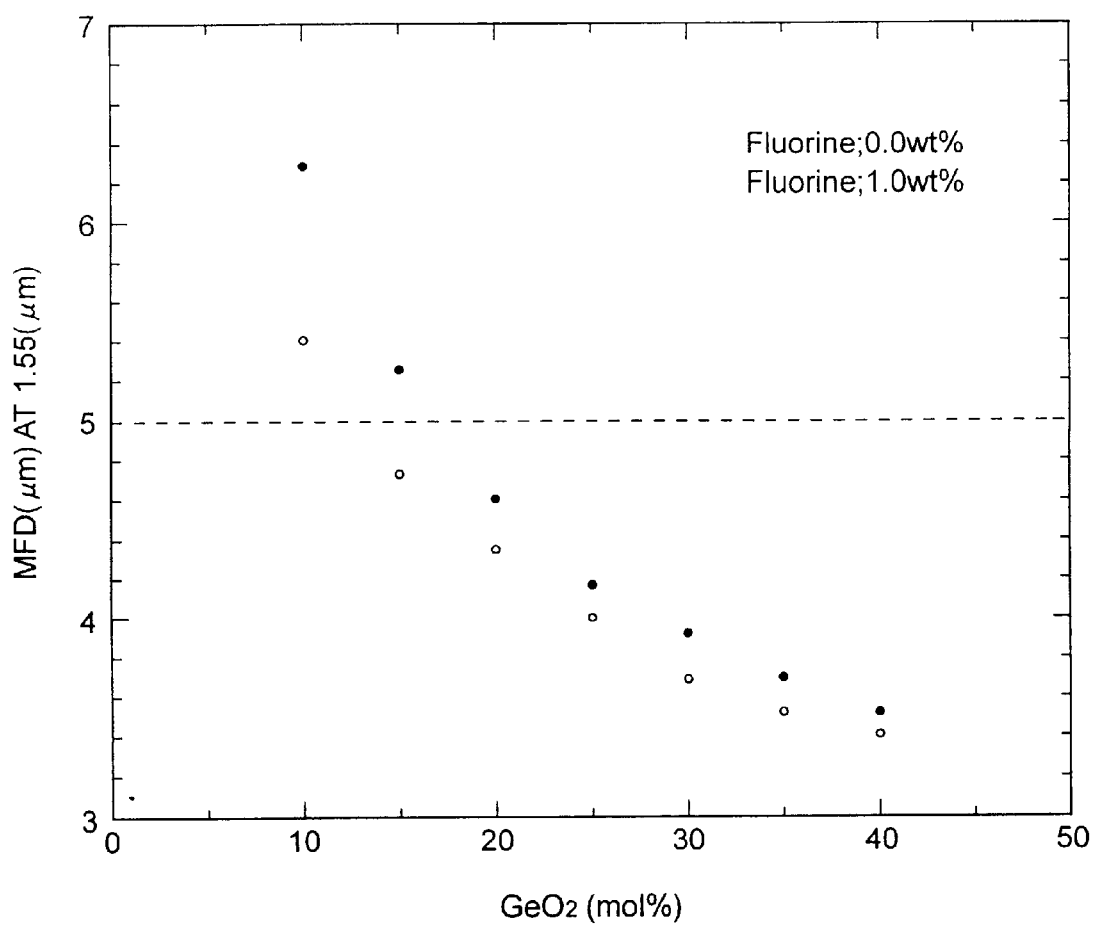
FIG. 2 is a graph showing a relationship between the amount of addition of $GeO_2$ in a core region and MFD at a wavelength of 1.55 $\mu$m.

FIG. 2 is a graph showing the relationship between the amount of addition of $GeO_2$ in the core region 101 and the MFD at a wavelength of 1.55 μm. This graph shows values respectively determined for samples (indicated by black circles) whose cladding region 102 is not doped with F element and samples (indica ted by white circles) whose cladding region 102 is doped with 1.0 wt % of F element, each of which has a core region 101 having a diameter adjusted within the range of 4.2 μm to 5.5 μm in order to attain a zero-dispersion wavelength of 1.55 μm regardless of the $GeO_2$ content.

As can be seen from this graph, the samples whose cladding region 102 is doped with F element have an MFD smaller than that of the samples not doped with F element. The MFD is 5 μm or less when the $GeO_2$ content is 15 mol % or more. The greater is the $GeO_2$ content, the smaller becomes the MFD. On the other hand, the smaller is the MFD, the higher becomes the nonlinear coefficient γ. Therefore, in order to generate the nonlinear optical phenomenon with high efficiency, it is preferred that the cladding region 102 be doped with F element. Nevertheless, the $GeO_2$ content exceeding 35 mol % is unfavorable because thereby the relative refractive index difference $Δ^+$ and cutoff wavelength would exceed 3.5% and 1.7 μm, respectively, and a single mode cannot be secured in a predetermined wavelength band. Therefore, the $GeO_2$ content in the core region 101 is preferably within the range of 15 mol % or more but 35 mol % or less.

The nonlinear optical fiber according to the present invention may be a polarization-maintaining optical fiber, which is provided with a stress-applying structure for applying a stress in a direction substantially perpendicular to its optical axis, and which is thereby adapted to maintain the plane of polarization of the propagating light. The nonlinear optical fiber to which the stress is applied by the stress-applying structure can maintain the plane of polarization of input light in a predetermined direction at the time of the nonlinear optical phenomenon, thus being able to generate the nonlinear optical phenomenon with higher efficiency. Specifically, a polarization-maintaining fiber 200 applicable to the nonlinear optical fiber has a configuration such as that shown in FIG. 3. This polarization-maintaining fiber 200 comprises a bare fiber 190 having a core region 201 extending along the optical axis AX and a cladding region 202 with a refractive index lower than that of the core region 201; and a hermetic coat 191 disposed around the outer periphery thereof. As with the above-mentioned nonlinear optical fiber 100, the polarization-maintaining fiber 200 has, at least, with respect to at least one signal light component in the signal light wavelength band of 1.55 μm, an MFD of 5 μm or less, a zero-dispersion wavelength of 1.5 μm or more but 1.6 μm or less, a cutoff wavelength of at least 1.4 μm but not greater than 1.7 μm at a fiber length of 2 m, a transmission loss of 3 dB/km or less, and a nonlinear coefficient of 10/W/km or more.

Figure 3:
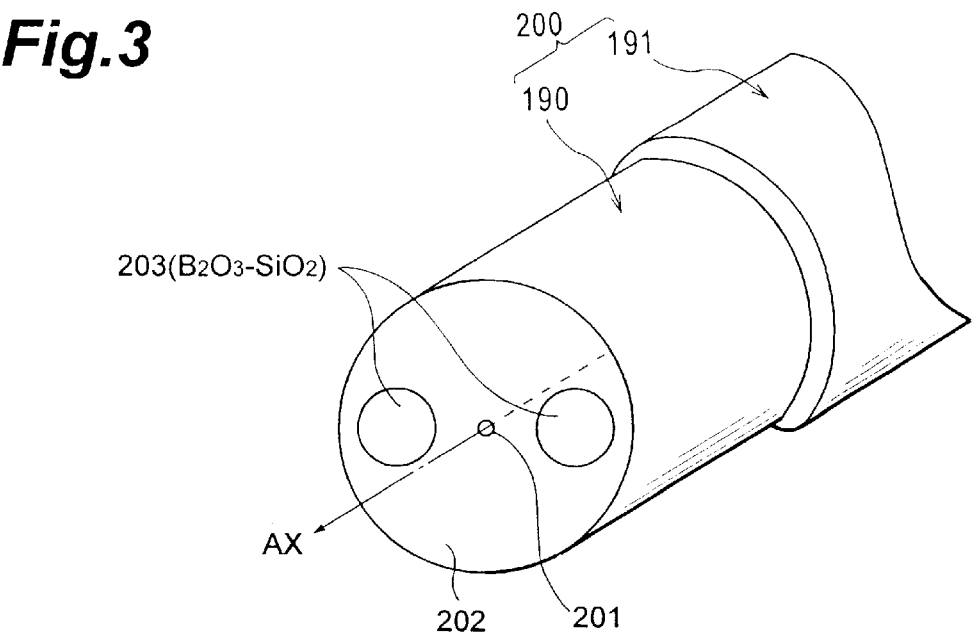
FIG. 3 is a view showing a sectional configuration of a polarization-maintaining fiber as an applied example of the nonlinear optical fiber according to the present invention.
Figure 4A:
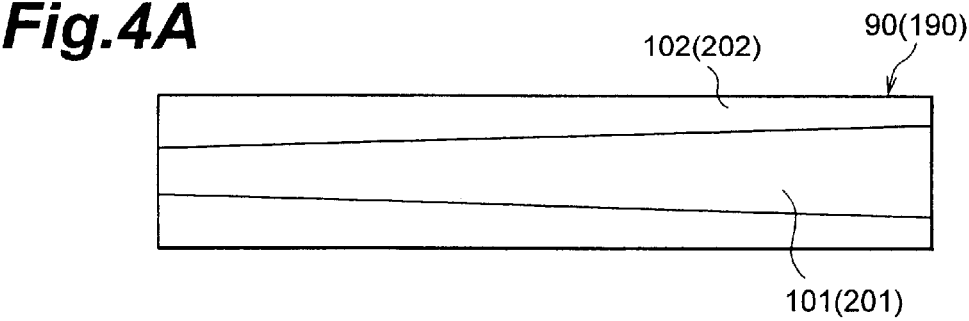
FIGS. 4A to 4C are views showing specific examples of a scattered-light-suppressing structure.
Figure 4B:
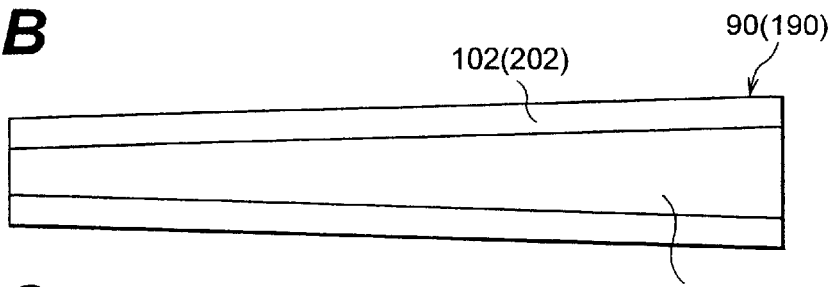
Figure 4C:
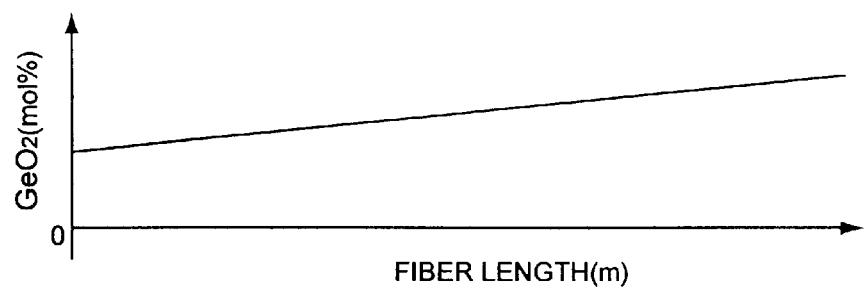

In particular, as shown in FIG. 3, the stress-applying structure can be realized by forming areas 203 doped with $B_2O_3$ (boron oxide) at predetermined locations substantially symmetrical to each other with respect to the optical axis in its cladding region 202 mainly composed of $SiO_2$, for example. In this case, since there is a difference in coefficient of thermal expansion between each area 203 doped with $B_2O_3$ (indicated by $B_2O_3$—$SiO_2$ in the drawing) and the undoped area, a stress is caused therebetween at the time of cooling after drawing, and thereby the plane of polarization can be maintained.

Since a highly efficient nonlinear optical phenomenon occurs when both energy conservation law and momentum conservation law hold true, it would be ideal if the wavelength dispersion should be zero at the wavelengths of light beams (input light and output light) involved in the nonlinear optical phenomenon. Actually, however, zero dispersion cannot completely be attained at the wavelengths of these light beams. Therefore, in practice, zero dispersion is established at one of wavelengths of input light beams, and the respective wavelengths of the other input and output light beams are set in the vicinity of this wavelength. Here, it will be unfavorable if the zero-dispersion wavelength range is beyond or below the wavelengths of the input and output light beams, since the nonlinear optical phenomenon will further occur between the input and output light beams. Hence, in order to avoid this, it is preferred that an appropriate wavelength dispersion slope be provided. For example, in the case where the input light has wavelengths of 1.48 μm and 1.55 μm, it is preferred that the wavelength dispersion slope be not less than 0.01 ps/km/nm², more preferably not less than 0.05 ps/km/nm² within the wavelength band range of 1.5 μm or more but 1.6 μm or less. Here, the preferable value of wavelength dispersion slope depends on the wavelength band width of input light and output light in the nonlinear optical phenomenon.

Also, when the intensity of light incident on the nonlinear optical fiber increases, the backward-scattered light drastically increases due to stimulated Brillouin scattering, and thereby the intensity of light propagating through the optical fiber is saturated. This is disadvantageous for the nonlinear optical fiber for generating the nonlinear optical phenomenon. Therefore, the nonlinear optical fiber 100 (200) according to the present invention can employ, as a structure for suppressing such scattering, a first structure shown in FIG. 4A in which the outside diameter of the core region is continuously changed, a second structure shown in FIG. 4B in which the outside diameter of the cladding region is changed along with the change in the outside diameter of the core region, or a third structure shown in FIG. 4C in which the $GeO_2$ content is continuously changed within a predetermined range along the optical axis. In the second structure, the outside diameter of the core region may be changed while the outside diameter of the cladding region is held constant. In the third structure, it is not necessary for the ratio of the outside diameter of the cladding region to that of the core region to be constant.

When the nonlinear optical fiber 100 (200) is provided with a scattered-light-suppressing structure such as those mentioned above (FIGS. 4A to 4C), stimulated Brillouin scattering can be restrained from occurring.

Preferably, as shown in FIGS. 1A and 3, the outer periphery of the cladding region 102 (202) of the nonlinear optical fiber 100 (200) according to the present invention is provided with the hermetic coat 91 (191) mainly composed of a water-impermeable material such as amorphous carbon or silicon carbide. While the fatigue coefficient of a normal optical fiber is about 20, the optical fiber 100 (200) provided with the hermetic coat 91 (191) has a fatigue coefficient of 100 or higher, thereby being able to restrain fatigue from progressing even if the nonlinear optical fiber 100 (200) is submerged into water or exposed to a high humidity for a long period of time. Also, since hydrogen is blocked from being dispersed into the optical fiber, a long-term reliability can be obtained.

FIG. 5 is a table showing results of evaluation of samples for the nonlinear optical fiber 100 according to this embodiment, prepared with different values of individual parameters. Here, 12 kinds of samples (nonlinear optical fibers) A to L were prepared. The respective columns in the table indicate successively from the leftmost column: (1) the kind of nonlinear optical fibers, (2) relative refractive index difference $\Delta^+$ (unit: %) of the core region 101 with respect to $SiO_2$, (3) relative refractive index difference $\Delta^-$ (unit: %) of the cladding region 102 with respect to $SiO_2$, (4) diameter 2a (unit: $\mu$m) of the core region 101, (5) MFD (unit: $\mu$m), (6) nonlinear coefficient $\gamma$ (unit: 1/W/km), (7) zero-dispersion wavelength (unit: nm), (8) transmission loss with respect to light having a wavelength of 1.55 $\mu$m (unit: dB/km), (9) cutoff wavelength (unit: nm) at a length of 2 m, (10) PMD (unit: ps/km$^{1/2}$), (11) diameter 2b (unit: $\mu$m) of the cladding region 102, and (12) fatigue coefficient.

As shown in this table, conditions for preparation are such that the outside diameter 2a of the core region 101 is 4.1 $\mu$m to 4.9 $\mu$m, the outside diameter 2b of the cladding region 102 is 124 $\mu$m to 126 $\mu$m, the relative refractive index difference $\Delta^+$ of the core region 101 with respect to $SiO_2$ is 1.5% to 4%, and the relative refractive index difference $\Delta^-$ (unit: %) of the cladding region 102 with respect to $SiO_2$ is 0% or 0.35%. Each of the samples A to L prepared under these conditions exhibited, with respect to signal light in the wavelength band of 1.55 $\mu$m, an MFD of 5 $\mu$m or less (actually 3.4 to 4.7 $\mu$m), a PMD of 1 ps/km$^{-1/2}$ or less (actually 0.03 to 0.11 ps/km$^{-1/2}$), a zero-dispersion wavelength of 1.5 $\mu$m or more but 1.6 $\mu$m or less (actually 1545 to 1560 nm), a transmission loss of 3 dB/km or less (actually 0.28 to 1.5 dB/km), and a nonlinear coefficient of 10/w/km or more (actually 10.5 to 24.2/W/km).

Among the samples A to L, the samples D to F have no F element added to their cladding regions 102, thereby exhibiting the relative refractive index difference $\Delta^-$ of 0% with respect to $SiO_2$. In each of the samples A to C and G to L, on the other hand, the cladding region 102 is doped with F element, and the relative refractive index difference $\Delta^-$ with respect to $SiO_2$ is 0.35%. Since the samples doped with F element exhibit lower transmission loss, smaller MFD, and higher nonlinear coefficient than the samples not doped with F element, it is preferred that the cladding region 102 be doped with F element.

While the samples A to I are not provided with a hermetic coat, the samples J to L are provided therewith. It can be seen that, while the samples without the hermetic coat exhibit a fatigue coefficient of 20 to 22, those provided with the hermetic coat exhibit a fatigue coefficient of 110 to 150, thereby yielding a longer-term reliability.

In the sample G, the relative refractive index difference $\Delta^+$ is 1.5% which is not sufficient, the nonlinear coefficient $\gamma$ is less than 10/W/km, and the cutoff wavelength is less than 1.4 $\mu$m. On the other hand, each of the samples H and I has a large relative refractive index difference $\Delta^+$ of 3.5% or more, and a cutoff wavelength exceeding 1.7 $\mu$m at a length of 2 m. Hence, the efficiency at which the nonlinear optical phenomenon occurs in the sample G is insufficient, whereas none of the samples H and I satisfies the single-mode condition with respect to light in the wavelength band of 1.55 $\mu$m. The other samples A to F and J to L exhibit a relative refractive index difference $\Delta^+$ of at least 2% but not greater than 3% and a cutoff wavelength of 1.4 $\mu$m or more but 1.7 $\mu$m or less, thus being suitable as the nonlinear optical fiber according to the present invention.

The above-mentioned samples are favorable in that their MFD becomes smaller and their nonlinear optical coefficient $\gamma$ becomes greater as their relative refractive index difference $\Delta^+$ is greater or their diameter 2a of the core region 101 is smaller. Since their cutoff wavelength accordingly becomes longer, however, there can occur a disadvantage in this regard. Among the samples A to L, the sample C has the smallest MFD, the highest nonlinear coefficient, and a cutoff wavelength of 1.4 $\mu$m or more but 1.7 $\mu$m or less, thus being the most suitable for the nonlinear optical fiber according to the present invention.

A sample of polarization-maintaining optical fiber (see FIG. 3) based on the sample C, in which predetermined areas symmetrical to each other with respect to its optical axis in the cladding region 102 were doped with $B_2O_3$ was prepared and evaluated as well. As a result, this polarization-maintaining optical fiber exhibited not only the mode field diameter, nonlinear coefficient, and zero-dispersion wavelength on a par with those of the nonlinear optical fiber C, but also a transmission loss of 0.61 dB/km and a polarization crosstalk of 25 dB at a length of 1 km. All these characteristic values are at their favorable levels.

As mentioned above, the nonlinear optical fiber according to this embodiment has an MFD of 5 $\mu$m or less and a nonlinear coefficient $\gamma$ on the order of 10/W/km to 20/W/km which is three to seven times as high as that of the conventional optical fiber, i.e., 3/W/km. Consequently, the nonlinear optical fiber according to this embodiment can generate a highly efficient nonlinear optical phenomenon when used at a length on a par with that of the conventional nonlinear optical fiber, or can generate output light having a sufficient power caused by the nonlinear optical phenomenon even when used at a shorter length (e.g., 1 km or less) than the conventional one.

Also, the nonlinear optical fiber according to this embodiment has a PMD of 1 ps/km$^{1/2}$ and a zero-dispersion wavelength of 1.5 $\mu$m or more but 1.6 $\mu$m or less, thereby being capable of yielding a favorable transmission characteristic with respect to signal light in the wavelength band of 1.55 $\mu$m. On the other hand, the nonlinear optical fiber according to this embodiment can secure a single mode with respect to signal light in the wavelength band of 1.55 82 m since its cutoff wavelength is 1.4 $\mu$m or more but 1.7 $\mu$m or more. Also, since this nonlinear optical fiber has a transmission loss of 3 dB/km or less, the loss in the light involved in the nonlinear optical phenomenon is small.

As can be seen from the foregoing, the nonlinear optical fiber 100 (or polarization-maintaining fiber 200) according to this embodiment can suitably be employed in a wavelength converter or an optical switch, for example. In this case, signal light (in the wavelength band of 1.55 $\mu$m) and excitation light (having a wavelength different from that of the signal light but in the 1.55-$\mu$m band, 1.48 $\mu$m) are multiplexed and fed into the nonlinear optical fiber. Then, one photon of the signal light and two photons of the excitation light are caused to form one photon of converted light due to four-wave mixing in the nonlinear optical fiber, and the resulting converted light is selectively outputted via an optical filter or the like. This converted light has an intensity corresponding to the intensity of the signal light and carries information identical to that carried by the signal light. Since the wavelength $\lambda c$ of converted light is represented by:

$$\lambda_c = 2 \cdot \lambda_e - \lambda_s \quad (4)$$

wherein $\lambda s$ is the wavelength of signal light and $\lambda e$ is the wavelength of excitation light, wavelength conversion would be realized. When the excitation light is outputted from a wavelength-variable light source, then the wavelength of the converted light outputted from the wavelength converter can be made variable as well.

Figure 6A:
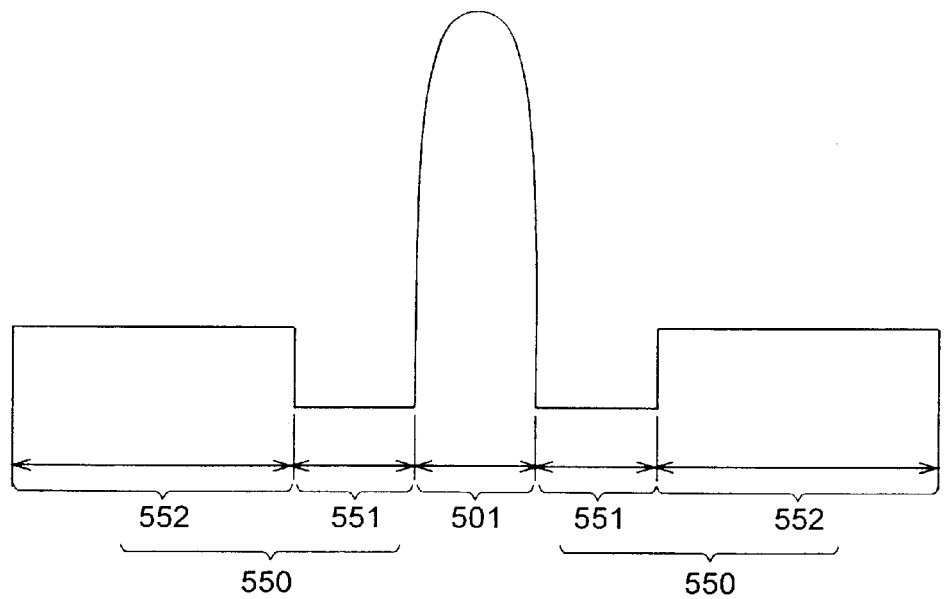
FIGS. 6A and 6B are views showing refractive index profiles applicable to a nonlinear optical fiber according to the present invention, respectively.
Figure 6B:
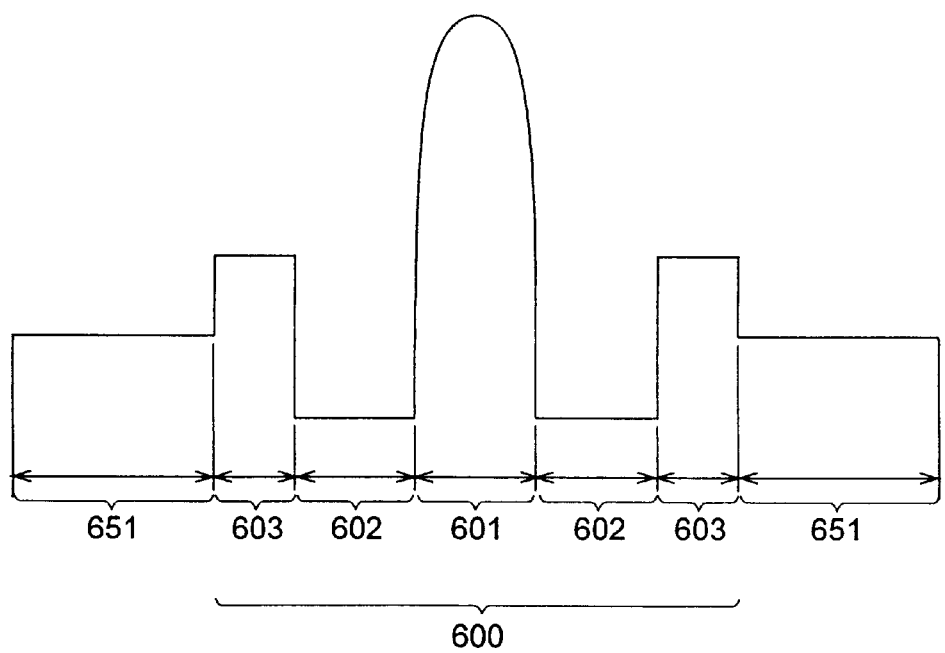

Without being restricted to the above-mentioned embodiment, the present invention can be modified in various manners. For example, the refractive index profile of the nonlinear optical fiber 100 is not limited to the matched cladding type refractive index profile shown in FIG. 1A. As shown in FIG. 6A, the optical fiber may have a refractive index profile (depressed cladding type refractive index profile) in which a cladding region provided with a depressed portion having a low refractive index is disposed around the core region. In the refractive index profile of FIG. 6A, an area 501 indicates the refractive index along a diametrical direction in the core region, whereas areas 550 indicate the refractive index along the diametrical direction in the cladding region. In particular, areas 551 indicate the refractive index along the diametrical direction of the depressed portion (the inner area of the cladding region), whereas areas 552 indicate the refractive index along the diametrical direction of the outer area in the cladding region located outside the depressed area. Further, the nonlinear optical fiber 100 may have a refractive index profile such as that shown in FIG. 6B. In this case, the core region comprises an inner core having a parabolic refractive index profile along a diametrical direction; an intermediate core, provided around the outer periphery of the inner core, having a refractive index lower than that of the inner core; and an outer core, provided around the outer periphery of the intermediate core, having a refractive index higher than that of the intermediate core. On the other hand, the cladding region is provided around the outer periphery of the outer core and has a refractive index lower than that of the outer core. In the refractive index profile of FIG. 6B, an area 600 shows the refractive index along a diametrical direction of the core region constituted by the above-mentioned three layers, in which areas 601, 602, and 603 indicate the respective refractive indexes of the inner, intermediate, and outer cores along the diametrical direction. Areas 651 indicate the refractive index along the diametrical direction of the cladding region.

As characteristics with respect to one or more signal light components in the signal light wavelength band of 1.55 $\mu$m, each refractive index profile has an MFD of 5 $\mu$m or less, a PMD of 1 ps/km$^{1/2}$ or less or a fixed plane of polarization, a zero-dispersion wavelength of 1.5 $\mu$m or more but 1.6 $\mu$m or less, a cutoff wavelength of 1.4 $\mu$m or more but 1.7 $\mu$m or less at a length of 2 m, a transmission loss of 3 dB/km or less, and a nonlinear coefficient of 10/W/km or more.

The above-mentioned various refractive index profiles are also applicable to the polarization-maintaining fiber 200 which can be employed in the nonlinear optical fiber according to the present invention.

Embodiments of the optical fiber coil according to the present invention will now be explained with reference to FIGS. 7 to 9. In the explanation of the drawings, constituents identical to each other will be referred to with numerals or letters identical to each other without their overlapping descriptions being repeated.

The nonlinear optical fiber shown in FIG. 1A or the polarization-maintaining optical fiber 200 shown in FIG. 3 is suitable for the nonlinear optical fiber employed in the optical fiber coil according to the present invention, and has at least, as characteristics with respect to signal light in the wavelength band of 1.55 $\mu$m, an MFD of 5 $\mu$m or less, a PMD of 1 ps/km$^{1/2}$ or less or a fixed plane of polarization, a zero-dispersion wavelength of 1.5 $\mu$m or more but 1.6 $\mu$m or less, a cutoff wavelength of or more 1.4 $\mu$m but 1.7 $\mu$m or less at a length of 2 m, a transmission loss of 3 dB/km or less, and a nonlinear coefficient $\gamma$ of 10/W/km or more.

For obtaining the above-mentioned characteristics, the nonlinear optical fiber 100 (200) is made such that the diameter 2a of the core region 101 (201) is 4.1 $\mu$m to 4.9 $\mu$m, the outside diameter 2b of the cladding region 102 (202) is 125 $\mu$m, the relative refractive index difference $\Delta^+$ of the core region 101 (201) with respect to SiO$_2$ is 2% to 3%, and the relative refractive index difference $\Delta^-$ of the cladding region 102 (202) with respect to SiO$_2$ is 0% to 0.35%. For obtaining a long-term reliability, in the nonlinear optical fiber 100 (200) applicable to the optical fiber coil according to the present invention, the hermetic coats 91, 191 are disposed around the outer peripheral surfaces of the bare fibers 90, 190, respectively (see FIGS. 1A and 3).

Figure 7:
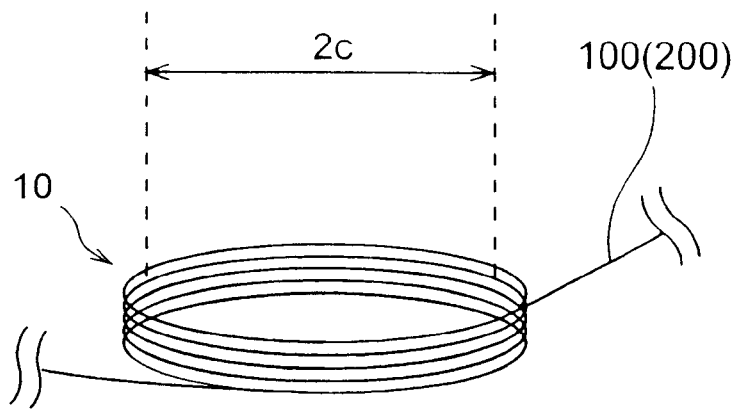
FIG. 7 is a view showing a schematic configuration of an optical fiber coil according to the present invention.

As shown in FIG. 7, the optical fiber coil 10 according to the present invention is obtained by winding the nonlinear optical fiber 100 (200) at a predetermined diameter 2c while maintaining the excellent characteristics thereof mentioned above. Preferably, in order to maintain the inside diameter 2c of the optical fiber coil 10, the nonlinear optical fiber 100 (200) is wound around a bobbin 20 having a barrel of diameter 2c as shown in FIG. 8.

When the barrel diameter 2c is 60 mm or less, the optical fiber coil 10 according to the present invention has, as characteristics (first condition) with respect to one or more signal light components each having a wavelength of 1.5 $\mu$m or more but 1.6 $\mu$m or less, a bending loss of 0.1 dB/km or less and a PMD of 1 ps/km$^{1/2}$ or less or a fixed plane of polarization (in which crosstalk of orthogonal polarization components is 15 dB or more). When the barrel diameter 2c is 20 mm or less, the optical fiber coil 10 has, as characteristics (second condition) with respect to one or more signal light components each having a wavelength of 1.5 $\mu$m or more but 1.6 $\mu$m or less, a bending loss of 1 dB/km or less and a PMD of 2 ps/km$^{1/2}$ or less or a fixed plane of polarization. The barrel diameter 2c is the minimum value of inside diameter of a coil into which the optical fiber 100 (200) is wound, and is the diameter of the barrel part of the bobbin 20 around which the optical fiber is wound.

As mentioned above, the optical fiber coil 10 wound at a barrel diameter of 60 mm has a small size and, with respect to signal light in the wavelength band of 1.55 $\mu$m, not only can generate a highly efficient nonlinear optical phenomenon but also can secure a favorable transmission characteristic. The optical fiber coil 10 wound at a barrel diameter of 20 mm can be made smaller than that wound at 60 mm, while maintaining its favorable characteristics. As a consequence, any optical fiber coil 10 having such a configuration is sufficiently employable as a component for a wavelength converter, optical switch, or the like utilizing a nonlinear optical phenomenon.

In addition, at each coil diameter (60 mm or 20 mm), it is more preferable for the nonlinear optical fiber 100 (200) to have a length of 1 km or less in order to reduce its size. Also, since the surface of the bare fiber 90 (190) is provided with the hermetic coat 91 (191) in each nonlinear optical fiber 100 (200) constituting the optical fiber coil 10 according to the present invention, the optical fiber coil 10 is excellent in the long-term reliability as well.

A first embodiment of the optical fiber coil according to the present invention will now be explained. The nonlinear optical fiber prepared in the first embodiment has an MFD of 3.7 $\mu$m, a nonlinear coefficient $\gamma$ of 20/W/km, a PMD of 0.03 ps/km$^{1/2}$, a zero-dispersion wavelength of 1552 nm, a transmission loss of 0.5 dB/km, a cutoff wavelength of 1610 nm at a length of 2 m, and a length of 500 m. A nonlinear optical fiber having such characteristics is obtained when the core region of an optical fiber having a matched cladding type refractive index profile (see FIG. 1A) has a diameter of 3.8 $\mu$m, the core region is doped with 29 mol % of GeO$_2$, and its cladding region is doped with 1 wt % of F element.

Figure 8:
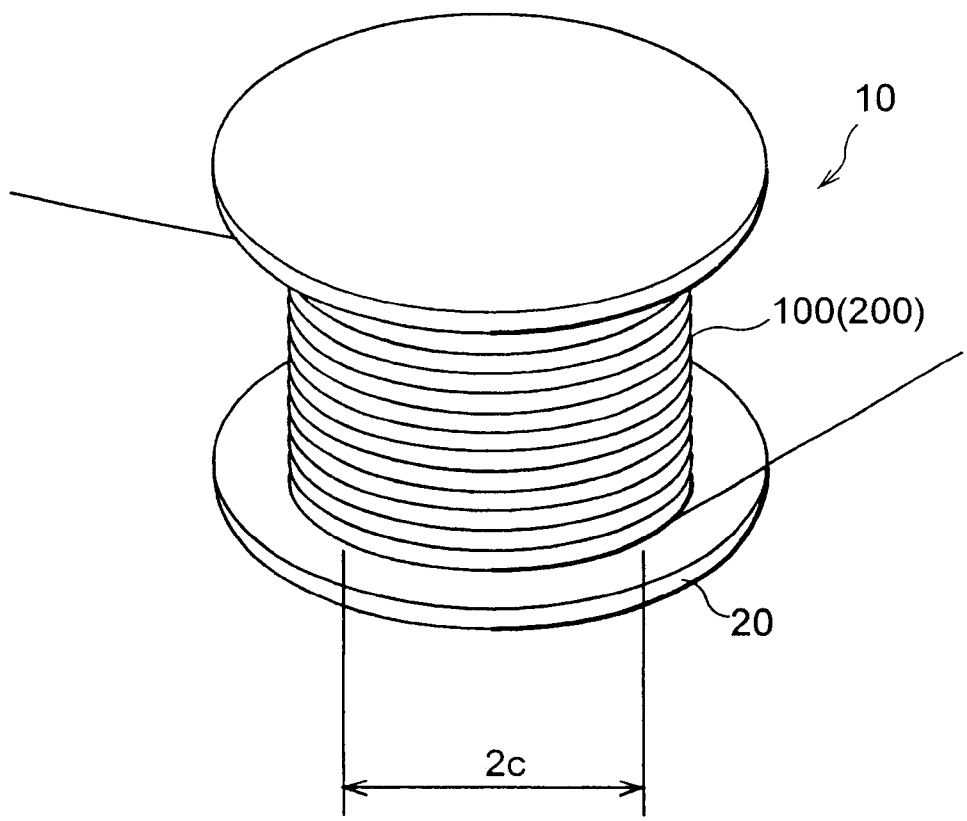
FIG. 8 is a view showing a specific configuration of the optical fiber coil according to the present invention.

When thus prepared nonlinear optical fiber is wound at a barrel diameter of 60 mm as shown in FIGS. 7 or 8, the optical fiber coil 10 has, with respect to signal light having a wavelength of 1.5 μm or more but 1.6 μm or less, a bending loss of 0 dB/km and a PMD of 0.05 ps/km$^{1/2}$. When the above-mentioned nonlinear optical fiber is wound at a barrel diameter of 20 mm, on the other hand, the optical fiber coil 10 has, with respect to signal light having a wavelength of 1.5 μm or more but 1.6 μm or less, a bending loss of 0 dB/km and a PMD of 0.07 ps/km$^{1/2}$. At each coil diameter, favorable characteristics are maintained. Here, the bending loss of 0 dB/km means that the loss is so small that its measurement is difficult, thereby the bending loss is negligible in practice.

A second embodiment of the optical fiber coil according to the present invention will now be explained. The nonlinear optical fiber prepared in the second embodiment has an MFD of 4.2 μm, a nonlinear coefficient γ of 13/W/km, a PMD of 0.05 ps/km$^{1/2}$, a zero-dispersion wavelength of 1545 nm, a transmission loss of 0.35 dB/km, a cutoff wavelength of 1500 nm at a length of 2 m, and a length of 500 m. A nonlinear optical fiber having such characteristics is obtained when the core region of an optical fiber having a matched cladding type refractive index profile (see FIG. 1A) has a diameter of 4.2 μm, the core region is doped with 20 mol % of GeO$_2$, and its cladding region is doped with 1 wt % of F element.

When thus prepared nonlinear optical fiber is wound at a barrel diameter of 60 mm as shown in FIGS. 7 or 8, the optical fiber coil 10 has, with respect to signal light having a wavelength of 1.5 μm or more but 1.6 μm or less, a bending loss of 0 dB/km and a PMD of 0.05 ps/km$^{1/2}$. When the above-mentioned nonlinear optical fiber is wound at a barrel diameter of 20 mm, on the other hand, the optical fiber coil 10 has, with respect to signal light having a wavelength of 1.5 μm or more but 1.6 μm or less, a bending loss of 0 dB/km and a PMD of 0.1 ps/km$^{1/2}$. At each coil diameter, favorable characteristics are maintained.

The inventors prepared various samples concerning the nonlinear optical fiber having the above-mentioned characteristics. These optical fibers are wound at predetermined barrel diameters so as to make optical fiber coils, whose bending loss and PMD were then measured. As a result, characteristics satisfying the above-mentioned first and second conditions concerning the barrel diameter, bending loss, and PMD relating to the optical fiber coil 10 according to the present invention were obtained.

The case of a conventional optical fiber coil will now be explained as a reference example for comparison. The optical fiber prepared here has, with respect to signal light having a wavelength of 1.5 μm to 1.6 μm, an MFD of 10.1 μm, a nonlinear coefficient γ of 0.7/W/km, a PMD of 0.04 ps/km$^{1/2}$, a zero-dispersion wavelength of 1542 nm, a transmission loss of 0.19 dB/km, a cutoff wavelength of 1100 nm at a length of 2 m, and a length of 500 m.

When this optical fiber is wound at a barrel diameter of 60 mm, the coil has, with respect to signal light having a wavelength of 1.5 or more am but 1.6 μm or less, a bending loss of 0.5 dB/km and a PMD of 0.04 ps/km$^{1/2}$. When wound at a barrel diameter of 20 mm, on the other hand, the optical coil has, with respect to signal light having a wavelength of 1.5 μm or more but 1.6 μm or less, a very large bending loss of 5000 dB/km. As a consequence, it was impossible to measure PMD in the coil wound at a barrel diameter of 20 mm.

FIG. 9 shows the results of measurement concerning the coils of the first and second embodiments and reference example mentioned above. In the table of FIG. 9, coil 1 and coil 2 refer to the coils of the first and second embodiments, respectively.

In the coil having a barrel diameter of 60 mm, while the conventional optical fiber coil indicated as the reference example has a bending loss of 0.5 dB/km, no bending loss can be seen to have occurred in the optical fiber coils 1 and 2 according to the present invention. Also, in the coil having a barrel diameter of 20 mm, while the conventional optical fiber coil indicated as the reference example has a very large bending loss of 5000 dB/km, no bending loss can be seen to have occurred in the optical fiber coils 1 and 2 according to the present invention. Thus, it can be seen that the optical fiber coils 1 and 2 according to the present invention can maintain excellent characteristics even when the barrel diameter is small.

In addition, the difference in life time in breakage of the nonlinear optical fiber constituting the optical fiber coil will be explained, depending on whether it has a hermetic coat or not. Here, the life time in breakage is given by estimating, from the fatigue coefficient, the time to elapse until one of 10$^6$ nonlinear optical fibers breaks. The rupture life of the nonlinear optical fiber provided with no hermetic coat is about 100 years when wound at a barrel diameter of 60 mm and about 5 years when wound at a barrel diameter of 20 mm. By contrast, the lifetime in breakage of the nonlinear optical fiber provided with a hermetic coat is 1000 years or longer when wound at a barrel diameter of 60 mm and is also 1000 years or longer when wound at a barrel diameter of 20 mm. Thus, while the optical fiber coil at a barrel diameter of 20 mm has a rupture life of only about 5 years when constituted by a nonlinear optical fiber with no hermetic coat, it has a rupture life of 1000 years or more when constituted by a nonlinear optical fiber provided with a hermetic coat, thereby yielding a long-term reliability.

Embodiments of the wavelength converter according to the present invention will now be explained with reference to FIGS. 10 to 13. In the explanation of the drawings, constituents identical to each other will be referred to with numerals or letters identical to each other without their overlapping descriptions being repeated.

The nonlinear optical fiber shown in FIG. 1A or the polarization-maintaining fiber shown in FIG. 3 is preferable as the nonlinear optical fiber employed in the wavelength converter according to the present invention.

When the nonlinear optical fiber is to be employed in the wavelength converter, it will be advantageous for reducing the size if the nonlinear optical fiber is wound like a coil having a small barrel diameter (e.g., a barrel diameter of about 60 mm or 20 mm). Here, when the nonlinear optical fiber 100 (200) according to the present invention is used for making the coil, a fiber length of 1 km or less is sufficient, thereby the PMD is 0.5 ps or less over the whole length thereof, and thus the favorable characteristics can be maintained. It has also been confirmed that, while a coil wound with a conventional optical fiber yields a few dB/km of bending loss and thus is unusable, a coil wound with the nonlinear optical fiber 100 (200) exhibits a bending loss of substantially 0 dB/km even at a barrel diameter of 20 mm, thus yielding favorable characteristics. Thus, the nonlinear optical fiber 100 (200) according to the present invention generates a highly efficient nonlinear optical phenomenon even at a short length, and can attain the coil 10 having a small barrel diameter while maintaining favorable characteristics. Hence employing the nonlinear optical fiber 100 (200) shown in FIGS. 1A and 3 or the optical fiber coil 10 shown in FIGS. 7 and 8 is quite effective in realizing a highly efficient, small-sized wavelength converter.

Figure 10:
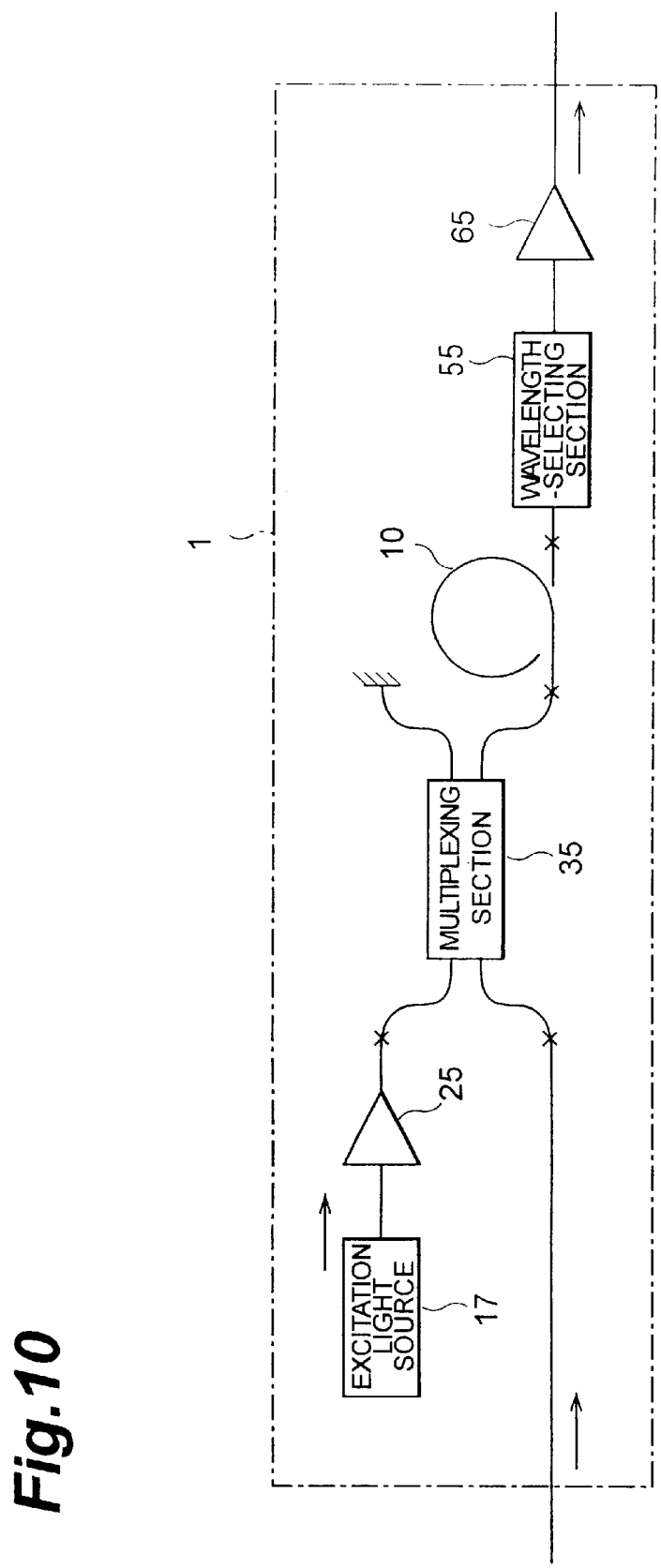
FIG. 10 is a view showing a schematic configuration of a wavelength converter according to the present invention.

The wavelength converter according to the present invention employs the optical fiber coil 10 constituted by such a nonlinear optical fiber 100 (200). FIG. 10 is a view showing a configuration of the wavelength converter according to the present invention. This wavelength converter 1 comprises an excitation light source 17 for outputting excitation light; an excitation-light-amplifying section 25 for optically amplifying and outputting the excitation light fed therein; a multiplexing section 35 for multiplexing and outputting the optically-amplified excitation light and signal light fed therein; the optical fiber coil 10 (constituted by the nonlinear optical fiber 100 (200)) for generating converted light by four-wave mixing due to the excitation light and signal light introduced from the multiplexing section 35; a wavelength-selecting section 55 for selectively outputting the converted light; and a converted-light-amplifying section 65 for optically amplifying and outputting the converted light outputted from the wavelength-selecting section 55.

Since the excitation light source 17 outputs excitation light having a predetermined wavelength, the wavelength of the excitation light may be fixed. Since the nonlinear optical fiber 100 (200) has excellent characteristics as mentioned above, however, it will be more preferable if the wavelength of the excitation light is made variable. As the excitation light source 17, a wavelength-variable laser diode, a wavelength-variable fiber laser light source, or the like can be employed, for example. The wavelength-variable laser diode is advantageous in that it can attain a small size and is able to yield a stable output. The wavelength-variable fiber laser light source is advantageous in that it can also attain a small size and is able to change the wavelength of the excitation light by a filter alone. The configuration of the wavelength-variable fiber laser light source will be explained later.

The excitation-light-amplifying section 25 optically amplifies the excitation light outputted from the excitation light source 17, thereby supplying a sufficient power to the excitation light fed into an optical fiber end of the optical fiber coil 10. Namely, since the intensity of converted light generated by four-wave mixing is in proportion to the product obtained by multiplying the power of inputted signal light and the square of the power of excitation light, the excitation-light-amplifying section 25 supplies a higher power to the excitation light in order to generate converted light having a sufficient power. Employable as the excitation-light-amplifying section 25, for example, is an optical amplifier (EDFA: Er-Doped Fiber Amplifier) comprising an optical fiber (EDF: Er-Doped Fiber) whose core region is doped with Er (erbium) element, which is a rare earth element. If excitation light having a sufficient power is outputted from the excitation light source 17, the excitation-light-amplifying section 25 will be unnecessary.

The multiplexing section 35 inputs therein the excitation light outputted from the excitation-light-amplifying section 25 after being optically amplified and the signal light to be wavelength-converted by the wavelength converter 1, and multiplexes and outputs them. As the multiplexing section 35, a 3-dB coupler, a polarization-independent coupler, a WDM coupler, or the like is employable, for example. The 3-dB coupler is preferable in that it can multiplex excitation light and signal light without greatly losing the power of any of them. The WDM coupler is preferable in that the loss can be suppressed to 3 dB or less in the case where the wavelength range of the excitation light or signal light is fixed to a certain extent.

The nonlinear optical fiber 100 (200) constituting the optical fiber coil has a length of 1 km or less, inputs therein the excitation light and signal light outputted from the multiplexing section 35, and generates converted light by four-wave mixing. Its specific configuration and characteristics have already been mentioned in conjunction with the descriptions concerning the nonlinear optical fiber 100 (200) of FIGS. 1A to 6 and the optical fiber coil 10 of FIGS. 7 to 9.

The wavelength-selecting section 55 inputs therein the excitation light, signal light, and converted light outputted from an optical fiber end of the optical fiber coil 10, and selectively outputs only the converted light. Employable as the wavelength-selecting section 55 is a fixed type band-pass filter, a wavelength-variable band-pass filter, a wavelength-variable high-pass filter, a wavelength-variable low-pass filter, an AWG (Arrayed Waveguide Grating), a WDM coupler, or the like, for example. The fixed type band-pass filter is preferable in that it is the least expensive when the wavelength of the converted light is fixed. Each of the wavelength-variable band-pass filter, wavelength-variable high-pass filter, and wavelength-variable low-pass filter is preferably used when the wavelength of the converted light is variable. Since the AWG has a plurality of output ports and can output the converted light to any of the output ports according to the wavelength of the converted light, it can perform a switching operation together with the wavelength conversion or carry out the wavelength conversion in combination with a switching device, for example, and various other applications are possible. The WDM coupler is preferable in that, when the wavelength of converted light is determined beforehand to be located on the longer or shorter wavelength side with respect to the wavelength of signal light, it can realize a wide band having a bandwidth of about 10 nm, thereby even collective WDM conversion can be handled inexpensively.

The converted-light-amplifying section 65 inputs therein the converted light outputted from the wavelength-selecting section 55, and optically amplifies and outputs the converted light. Thus outputted converted light (amplified converted light) becomes the output of the wavelength converter 1. Namely, since there is not only the case where the nonlinear coefficient γ of the nonlinear optical fiber 100 (200) constituting the optical fiber coil 10 is so high that the converted light occurs with high efficiency, but also the case where converted light having a sufficient power cannot be obtained, the converted-light-amplifying section 65 enhances the power of the converted light in the latter case. As the converted-light-amplifying section 65, an EDFA is employable, for example. If converted light having a sufficient power is outputted from the wavelength-selecting section 55, the converted-light-amplifying section 65 will be unnecessary.

The excitation light source 17, excitation-light-amplifying section 25, multiplexing section 35, optical fiber coil 10, wavelength-selecting section 55, and converted-light-amplifying section 65 are optically connected to each other by optical fibers and the like. Among them, the nonlinear optical fiber 100 (200) constituting the optical fiber coil 10 has a core region diameter and MFD which are smaller than those of a conventional optical fiber, thereby connection loss increases when it is connected to the conventional optical fiber.

Therefore, it is preferred that the optical fiber input end of the optical fiber coil 10 be connected to the output end of the multiplexing section 35 via an optical fiber whose connection loss is 1 dB or less. On the other hand, the optical fiber output end of the optical fiber coil 10 is preferably connected to the input end of the wavelength-selecting section 55 via an optical fiber whose connection loss is 1 dB or less. In order to suppress the connection loss to 1 dB or less, it is necessary to select the optical fiber to be connected according to the overlapping integral between the electromagnetic distribution of the propagating light in the nonlinear optical fiber 100 (200) and the electromagnetic distribution of the propagating light in the optical fiber to be connected thereto. In this case, the loss in each of the signal light, excitation light, and converted light can be suppressed, and the converted light can be outputted with a sufficient power.

The optical fiber input end of the optical fiber coil 10 may be connected to the output end of the multiplexing section 35 via at least one cascaded optical fiber each having a gradually-increasing or gradually-decreasing MFD. On the other hand, the optical fiber output end of the optical fiber coil 10 may be connected to the input end of the wavelength-selecting section 55 via one or more cascaded optical fibers each having a gradually-increasing or gradually-decreasing MFD. Since the connection loss is also reduced in this case, the loss in signal light, excitation light, and converted light can be suppressed, thereby the converted light being outputted with a sufficient power.

Figure 11:
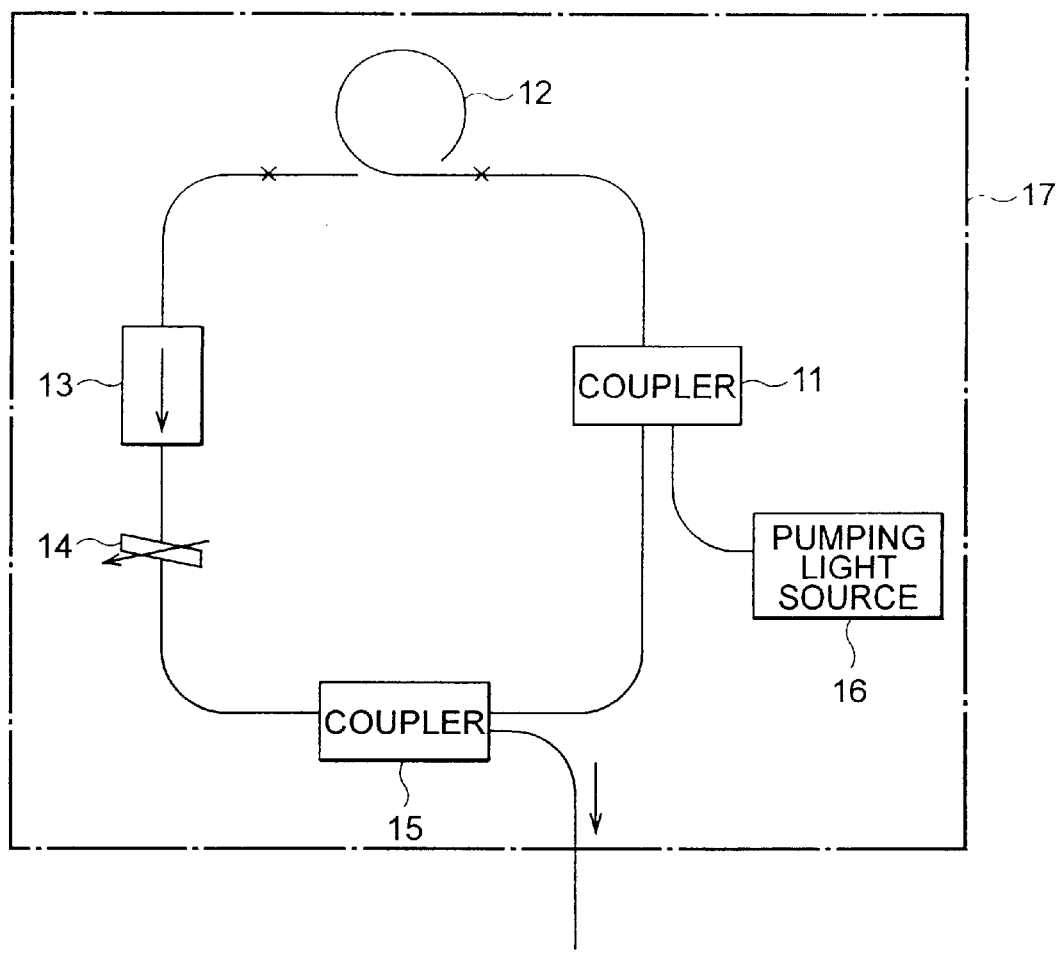
FIG. 11 is a view showing a schematic configuration of an excitation light source (wavelength-variable fiber laser light source)

As a configurational example of the excitation light source 17, a configuration of the wavelength-variable fiber laser light source will be explained with reference to FIG. 11. FIG. 11 is a view showing the configuration of the wavelength-variable fiber laser light source. In the wavelength-variable fiber laser light source 17, a WDM coupler 11, an EDF 12, an optical isolator 13, a wavelength-variable filter 14, and a 3-dB coupler 15 are disposed in a ring shape and optically connected to each other via optical fibers or the like. Also, a pumping light source 16 is optically connected to the WDM coupler 11, thereby constituting a ring-shaped laser oscillator.

The pumping light outputted from the pumping light source 16 is fed into the EDF 12 via the WDM coupler 11, thereby exciting $Er^{3+}$ ions contained in the EDF 12. Though the $Er^{3+}$ ions in this excitation state then return to their ground state, of the components of the light generated at that time, those having a predetermined wavelength transmittable through the wavelength-variable filter 14 are fed into the EDF 12 via the optical isolator 13, wavelength-variable filter 14, 3-dB coupler 15, and WDM coupler 11. As this predetermined wavelength of light is fed into the EDF 12, laser oscillation occurs therein due to stimulated emission. Part of the laser-oscillated light is taken out from the 3-dB coupler 15 to become excitation light. Namely, by changing the transmission wavelength in the wavelength-variable filter 14, the wavelength of the excitation light outputted from the wavelength-variable fiber laser light source can be altered.

The wavelength-variable fiber laser light source can be made smaller than a wavelength-variable laser diode equipped with a diffraction grating for selecting a wavelength. As a consequence, employing such a wavelength-variable fiber laser light source can reduce the size of the wavelength converter 1 as a whole.

Figure 12:
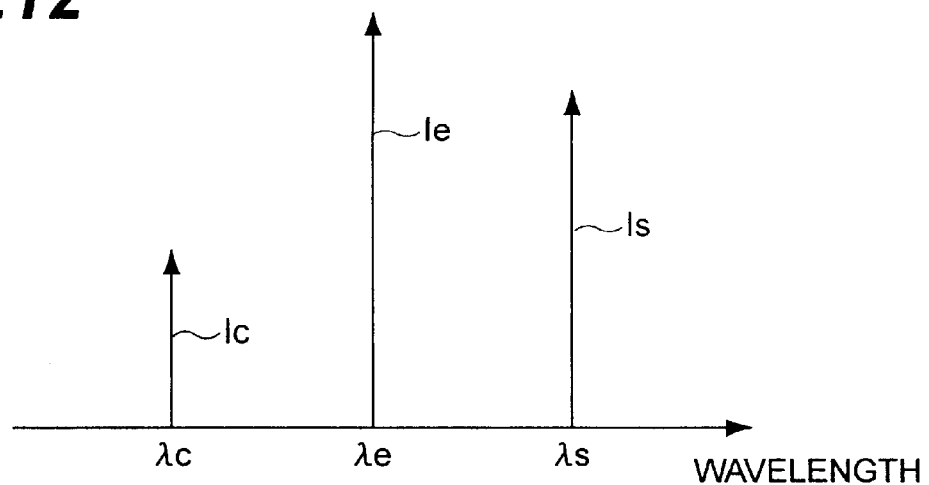
FIG. 12 is a view for explaining an operation of the wavelength converter according to the present invention.

The operation of the wavelength converter according to the present invention will now be explained. FIG. 12 is an explanatory view for the operation of the wavelength converter according to the present invention. In this drawing, the abscissa indicates wavelength, whereas the ordinate indicates the spectral intensity of each light. Let the wavelength of the excitation light fed into the nonlinear optical fiber of the optical fiber coil 10 be $\gamma e$, its spectral intensity be Ie, the wavelength of the signal light fed into the wavelength converter 1 be $\gamma s$, its spectral intensity be Is, the wavelength of the converted light outputted from the wavelength converter 1 be $\gamma c$, and its spectral intensity be Ic.

In the nonlinear optical fiber (constituting the optical fiber coil 10) of the wavelength converter 1, one photon of converted light is generated from one photon of signal light and two photons of excitation light by four-wave mixing. As long as the spectral intensity Ie of excitation light is constant, the spectral intensity Ic of converted light is a value corresponding to the spectral intensity Is of signal light, thereby the converted light being generated contains information identical to that contained in the signal light. Also, with respect to the wavelength $\gamma s$ of signal light and the wavelength $\gamma e$ of excitation light, the wavelength $\gamma c$ of converted light is given by the following equation (5):

$$\gamma_c = 2\cdot\gamma_e - \gamma_s \quad (5)$$

As can be seen from this equation, if the wavelength $\gamma e$ of the excitation light outputted from the excitation light source 17 is variable, then the wavelength $\gamma c$ of converted light will also be variable.

Here, the spectral intensity Ie of the excitation light fed into the nonlinear optical fiber of the optical fiber coil is preferably 10 dBm or higher. Also, the conversion efficiency $\eta(\%)$ is defined by the following equation (6):

$$\eta = 100 \times I_c/I_s \quad (6)$$

Preferably, the conversion efficiency $\eta$ is 0.1% or higher. The width of the signal light wavelength band in which the decrease in the spectral intensity of the converted light with respect to the maximum spectral intensity of the converted light becomes 3 dB or less is preferably 10 nm or greater. It is preferred that the converted light be outputted with a conversion efficiency of 0.1% or higher with respect to the inputted signal light in this wavelength band. In the case where signal light has a plurality of wavelengths, it is preferred that at least one wavelength of signal light therein satisfy the above-mentioned conditions.

Figure 13:
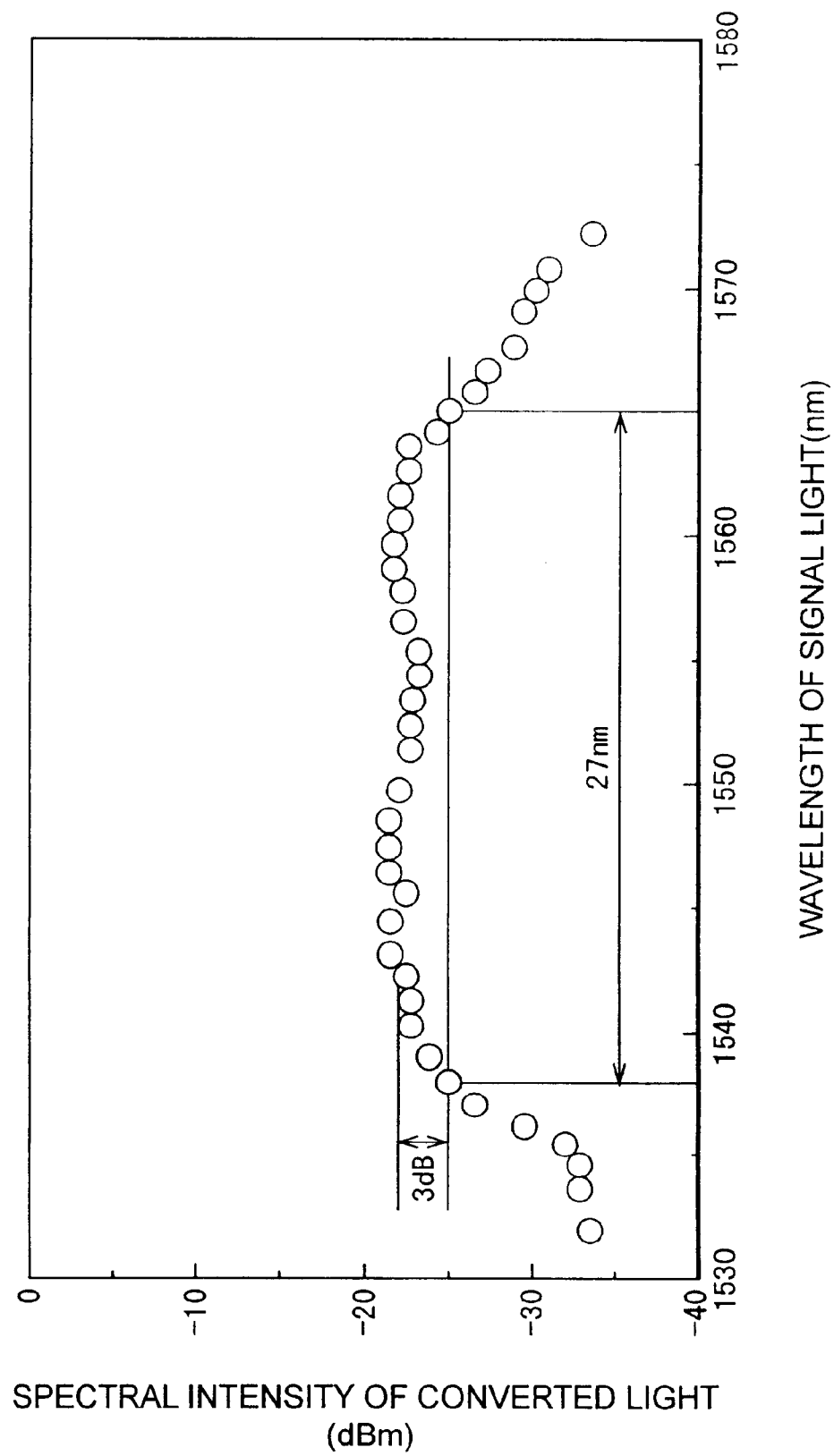
FIG. 13 is a graph showing the wavelength dependence of spectral intensity of converted light obtained by the wavelength converter according to the present invention with respect to signal light (input light).

The dependence of spectral intensity of converted light on signal light wavelength in the wavelength converter according to the present invention will now be explained. FIG. 13 is a graph showing the wavelength dependence of converted light with respect to signal light in the wavelength converter according to the present invention. Plotted in this graph are the respective spectral intensities of converted light outputted from the wavelength converter 1 with respect to individual wavelengths of signal light fed into the wavelength converter 1 which are changed within the range from 1532 nm to 1572 nm.

The nonlinear optical fiber prepared for this measurement has an MFD of 3.8 $\mu$m, a zero-dispersion wavelength of 1.55 $\mu$m, a cutoff wavelength of 1.63 $\mu$m at a length of 2 m, a transmission loss of 0.51 dB/km, a nonlinear coefficient $\gamma$ of 20.4/W/km, a dispersion slope of +0.032 ps/km/nm$^2$, and a length of 500 m. Here, the power of signal light is 1 mW, whereas the power of excitation light is 10 mW. The wavelength of excitation light is 1.55 $\mu$m, which is identical to the zero-dispersion wavelength.

As can be seen from this graph, within the bandwidth of 27 nm in which the wavelength of signal light ranges from 1538 nm to 1565 nm, the decrease in spectral intensity of converted light is 3 dB or less with respect to its maximum spectral intensity, and the conversion efficiency is flat over a wide wavelength band. As a consequence, if the power of excitation light is set appropriately, the conversion efficiency can be 0.1% or higher in this band.

Though the zero-dispersion wavelength of the nonlinear optical fiber employed in the wavelength converter 1 according to the present invention is not constant but fluctuates along its optical axis in practice, converted light can be generated with high efficiency even in this case if the dispersion value at the wavelength of excitation light is substantially 0 ps/nm/km at a given point along the optical axis of the nonlinear optical fiber. In the wavelength converter 1 according to the present invention, even when the zero-dispersion wavelength of the nonlinear optical fiber fluctuates along the optical axis, the width of fluctuation in zero-dispersion wavelength is small over the whole length of the nonlinear optical fiber since its length is 1 km or less, which is relatively short. As a consequence, in the wavelength converter 1 according to the present invention, the width of wavelength band of signal light in which the drop of spectral intensity of converted light with respect to the maximum spectral intensity is 3 dB or less can be made 10 nm or greater. Further, in this wavelength band, converted light can be obtained with a conversion efficiency of 0.1% or higher with respect to signal light.

In the case where the power fed into the wavelength converter 1 is weak or insufficient, the wavelength converter 1 may further comprise a signal-light-amplifying section for optically amplifying the signal light fed therein, so as to enhance the power of signal light. In this case, the signal-light-amplifying section is disposed between the signal light input end in the wavelength converter 1 and the input end of the multiplexing section 35, such as to cause the signal light fed into the nonlinear optical fiber of the optical fiber coil 10 to have a power at a predetermined level or higher. Without the excitation-light-amplifying section 25 and the above-mentioned signal-light-amplifying section being provided, the wavelength converter 1 may comprise a light-amplifying section disposed between the multiplexing section 35 and the nonlinear optical fiber of the optical fiber coil 10, such that both the excitation light and signal light multiplexed by and outputted from the multiplexing section 35 are optically amplified together by the light-amplifying section so as to be fed into the nonlinear optical fiber.

Industrial Applicability

As explained in detail in the foregoing, the nonlinear optical fiber according to the present invention has specific characteristics with respect to at least one signal light component in the wavelength band of 1.55 $\mu$m. As a consequence, it can generate a nonlinear optical phenomenon with higher efficiency (i.e., at a shorter length than conventionally possible), thereby making it possible to obtain converted light having a sufficient power.

Thus, when such a nonlinear optical fiber is employed in a wavelength converter, an optical switch or the like, the size of such a wavelength converter, optical switch, or the like can be reduced if the nonlinear optical fiber is wound around a predetermined barrel diameter so as to constitute an optical fiber coil. Also, such an optical fiber coil not only can generate a highly efficient nonlinear optical phenomenon with respect to at least one signal light component in the wavelength band of 1.55 $\mu$m, but also can secure a favorable transmission characteristic of signal light, while satisfying a single mode condition.

Further, since the above-mentioned nonlinear optical fiber has a length of 1 km or less, the wavelength converter including, as its component, the nonlinear optical fiber or the optical fiber coil comprising the nonlinear optical fiber can have a smaller size and is capable of outputting highly efficient converted light.

What is claimed is:

1. A nonlinear optical fiber for generating a nonlinear phenomenon with respect to input light having a predetermined wavelength, said nonlinear optical fiber comprising a core region and a cladding region provided at an outer periphery of said core region and having as characteristics with respect to said input light:

a mode field diameter of 5 $\mu$m or less;

a polarization mode dispersion of 1 ps/km$^{1/2}$ or less or a fixed plane of polarization;

a zero-dispersion wavelength of not less than 1.5 $\mu$m but not greater than 1.6 $\mu$m;

a cutoff wavelength of not less than 1.4 $\mu$m but not greater than 1.7 $\mu$m at a length of 2 m;

a transmission loss of 3 dB/km or less; and a nonlinear coefficient of 10/W/km or more.

2. A nonlinear optical fiber according to claim 1, wherein said core region is mainly composed of $SiO_2$, containing $GeO_2$ not less than 15 mol % but not greater than 35 mol % on average.

3. A nonlinear optical fiber according to claim 2, wherein said core region includes an area in which contents of $GeO_2$ continuously changes along a longitudinal direction of said nonlinear optical fiber.

4. A nonlinear optical fiber according to claim 2, wherein said cladding region includes an area doped with F element.

5. A nonlinear optical fiber according to claim 2, further provided with a stress-applying structure for applying a stress to said nonlinear optical fiber.

6. A nonlinear optical fiber according to claim 1, having a dispersion slope of 0.01 ps/km/nm$^2$ or more with respect to said input light having a predetermined wavelength.

7. A nonlinear optical fiber according to claim 6, having a dispersion slope of 0.05 ps/km/nm$^2$ or more with respect to said input light having a predetermined wavelength.

8. A nonlinear optical fiber according to claim 1, wherein said core region has an area having an outside diameter continuously changing along a longitudinal direction of said nonlinear optical fiber.

9. A nonlinear optical fiber according to claim 8, wherein the outside diameter of said cladding region changes along with the change in outside diameter of said core region along the longitudinal direction of said nonlinear optical fiber.

10. A nonlinear optical fiber according to claim 1, further comprising a hermetic coat provided at an outer periphery of said cladding region.

11. An optical fiber coil comprising a nonlinear optical fiber which is wound at a predetermined diameter and generates a nonlinear phenomenon with respect to input light having a predetermined wavelength, said nonlinear optical fiber having as characteristics with respect to said input light:

a mode field diameter of 5 $\mu$m or less;

a polarization mode dispersion of 1 ps/km$^{1/2}$ or less or a fixed plane of polarization;

a zero-dispersion wavelength of not less than 1.5 $\mu$m but not greater than 1.6 $\mu$m;

a cutoff wavelength of not less than 1.4 $\mu$m but not greater than 1.7 $\mu$m at a length of 2 m;

a transmission loss of 3 dB/km or less; and a nonlinear coefficient of 10/W/km or more.

12. An optical fiber coil according to claim 11, wherein said nonlinear optical fiber is wound such as to have an inner diameter of 60 mm or less and has as characteristics with respect to said input light having a predetermined wavelength:

a bending loss of 0.1 dB/km or less; and a polarization mode dispersion of 1 ps/km$^{1/2}$ or less.

13. An optical fiber coil according to claim 11, wherein said nonlinear optical fiber is wound such as to have an inner diameter of 20 mm or less and has as characteristics with respect to said input light having a predetermined wavelength:

a bending loss of 1 dB/km or less; and a polarization mode dispersion of 2 ps/km$^{1/2}$ or less.

14. An optical fiber coil according to claim 11, wherein said nonlinear optical fiber has a length of 1 km or less.

15. An optical fiber coil according to claim 11, wherein said nonlinear optical fiber comprises a hermetic coat provided on the outer periphery of a cladding region.

16. A wavelength converter comprising:

an excitation light source for outputting excitation light having a predetermined wavelength;

a multiplexing section for multiplexing and outputting said excitation light and a signal light;

a nonlinear optical fiber for receiving therein said excitation light and signal light outputted from said multiplexing section and generating a nonlinear phenomenon with respect to said excitation light, said nonlinear optical fiber having as characteristics with respect to said excitation light:

a mode field diameter of 5 μm or less, a polarization mode dispersion of 1 ps/km$^{1/2}$ or less or a fixed plane of polarization, a zero-dispersion wavelength of not less than 1.5 μm but not greater than 1.6 μm, a cutoff wavelength of not less than 1.4 μm but not greater than 1.7 μm at a length of 2 m, a transmission loss of 3 dB/km or less, and a nonlinear coefficient of 10/W/km or more; and a wavelength-selecting section for selecting a wavelength of light to be outputted and outputting converted light having thus selected wavelength, said converted light being generated by said nonlinear optical fiber.

17. A wavelength converter according to claim 16, wherein said nonlinear optical fiber has a dispersion value of substantially 0 ps/nm/km at a given point along a longitudinal direction of said nonlinear optical fiber with respect to a predetermined wavelength component of said excitation light.

18. A wavelength converter according to claim 16, wherein said excitation light source has a structure adapted to change the wavelength of said excitation light to be outputted.

19. A wavelength converter according to claim 16, wherein said excitation light source outputs said excitation light having a power of 10 dBm or more.

20. A wavelength converter according to claim 16, wherein an input end of said nonlinear optical fiber is connected to an output end of said multiplexing section via an optical fiber having a mode field diameter successively decreasing along a path through which said signal light propagates.

21. A wavelength converter according to claim 16, wherein an output end of said nonlinear optical fiber is connected to an input end of said wavelength-selecting section via an optical fiber having a mode field diameter successively increasing along a path through which said signal light propagates.

22. A wavelength converter according to claim 16, further comprising a converted-light-amplifying section for optically amplifying said converted light.

23. A wavelength converter according to claim 16, further comprising an excitation-light-amplifying section for optically amplifying said excitation light.

24. A wavelength converter according to claim 16, wherein a wavelength band of said signal light in which a decrease in spectral intensity of said converted light with respect to the maximum spectral intensity of said converted light becomes 3 dB or less has a width of 10 nm or more.

25. A wavelength converter according to claim 16, wherein said nonlinear optical fiber has a length of 1 km or less.

26. A wavelength converter according to claim 16, wherein said nonlinear optical fiber outputs said converted light having a power not less than 0.1% that of said signal light inputted therein.

* * * * *